United States Patent
Abraham et al.

(10) Patent No.: US 11,134,469 B2
(45) Date of Patent: Sep. 28, 2021

(54) RELIABILITY FOR MULTICAST TRANSMISSIONS

(71) Applicant: QUALCOMM incorporated, San Diego, CA (US)

(72) Inventors: Santosh Paul Abraham, San Diego, CA (US); Miguel Griot, La Jolla, CA (US); Linhai He, San Diego, CA (US); Jing Jiang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/543,777

(22) Filed: Aug. 19, 2019

(65) Prior Publication Data

US 2020/0068528 A1   Feb. 27, 2020

Related U.S. Application Data

(60) Provisional application No. 62/720,743, filed on Aug. 21, 2018.

(51) Int. Cl.
*H04W 72/04* (2009.01)
*H04W 72/00* (2009.01)
(Continued)

(52) U.S. Cl.
CPC ......... *H04W 72/005* (2013.01); *H04L 1/1896* (2013.01); *H04W 36/0007* (2018.08); *H04W 72/042* (2013.01); *H04W 72/0466* (2013.01)

(58) Field of Classification Search
CPC ..... H04W 72/00; H04W 72/04; H04W 36/00; H04W 72/005; H04W 72/0466;
(Continued)

(56) References Cited

U.S. PATENT DOCUMENTS

| 2003/0003937 A1* | 1/2003 | Ohkubo | H04B 7/0608 455/517 |
| 2006/0198341 A1* | 9/2006 | Singh | H04W 36/12 370/331 |

(Continued)

FOREIGN PATENT DOCUMENTS

| EP | 3125583 A1 | 2/2017 |
| WO | WO-2017035727 A1 | 3/2017 |
| WO | WO-2018063326 A1 | 4/2018 |

OTHER PUBLICATIONS

Partial International Search Report—PCT/US2019/047293—ISA/EPO—dated Nov. 7, 2019.

(Continued)

*Primary Examiner* — Chi Ho A Lee
(74) *Attorney, Agent, or Firm* — Holland & Hart LLP; Timothy R. Hirzel

(57) ABSTRACT

Methods, systems, and devices for wireless communications are described. A wireless communications system may support multicast transmissions from a base station to multiple user equipments (UEs). Each UE may have uplink resources allocated for providing feedback to the base station regarding multicast transmissions. For example, a UE may not successfully decode one or more frames of a multicast transmission. When a UE does not successfully decode the one or more frames, the UE may transmit negative acknowledgment (NACK) feedback indicating the one or more frames that were not successfully received. A serving base station may store frames within a buffer for a transmission window and retransmit each of the frames indicated within the NACK feedback from the stored frames. In some cases, the serving base station may not retransmit frames that were not indicated within the NACK feedback (e.g., frames that may have been received successfully by the UE).

29 Claims, 27 Drawing Sheets

(51) Int. Cl.
  *H04L 1/18* (2006.01)
  *H04W 36/00* (2009.01)

(58) Field of Classification Search
  CPC .. H04W 72/042; H04W 36/0007; H04L 1/18; H04L 1/1896
  See application file for complete search history.

(56) References Cited

U.S. PATENT DOCUMENTS

| | | | | |
|---|---|---|---|---|
| 2007/0177555 | A1* | 8/2007 | Brueck | H04L 12/189 370/338 |
| 2011/0083035 | A1* | 4/2011 | Liu | H04L 1/1848 714/4.1 |
| 2011/0116435 | A1 | 5/2011 | Liu et al. | |
| 2014/0098721 | A1* | 4/2014 | Chen | H04W 72/0446 370/280 |
| 2016/0044691 | A1 | 2/2016 | Montojo et al. | |
| 2016/0374009 | A1* | 12/2016 | Hiertz | H04W 48/16 |
| 2017/0026431 | A1* | 1/2017 | Oren | H04L 1/1685 |
| 2017/0142766 | A1* | 5/2017 | Kim | H04W 48/20 |
| 2017/0353273 | A1 | 12/2017 | Zhang et al. | |
| 2017/0366922 | A1* | 12/2017 | Yang | H04W 88/02 |
| 2018/0212736 | A1* | 7/2018 | Chatterjee | H04L 5/0094 |
| 2019/0028853 | A1* | 1/2019 | Logvinov | H04W 4/06 |
| 2019/0174373 | A1* | 6/2019 | Kanazawa | H04W 92/20 |
| 2019/0190659 | A1* | 6/2019 | Tang | H04L 1/1854 |
| 2019/0222532 | A1 | 7/2019 | Liu et al. | |
| 2020/0204329 | A1 | 6/2020 | Fujishiro et al. | |

OTHER PUBLICATIONS

International Search Report and Written Opinion—PCT/US2019/047293—ISA/EPO—dated Jan. 20, 2020.

* cited by examiner

US 11,134,469 B2

RELIABILITY FOR MULTICAST TRANSMISSIONS

CROSS REFERENCE

The present application for patent claims the benefit of U.S. Provisional Patent Application No. 62/720,743 by Abraham et al., entitled "RELIABILITY FOR MULTICAST TRANSMISSIONS," filed Aug. 21, 2018, assigned to the assignee hereof, and expressly incorporated by reference in its entirety.

FIELD OF TECHNOLOGY

The following relates generally to wireless communications, and more specifically to reliability for multicast transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may use multicast transmissions to broadcast data from one or more base stations to multiple UEs. For example, content may be provided to multiple UEs through a particular cell or a cluster of cells, where the content may include, for example, live event coverage for users attending the event. Some UEs, however, may not receive the multicast data, or may receive the data with errors (e.g., due to interference or other factors), thereby affecting the reliability and efficiency of multicast services.

SUMMARY

The described techniques relate to improved methods, systems, devices, and apparatuses that support reliability for multicast transmissions. Generally, the described techniques provide negative acknowledgment (NACK) feedback to a serving base station or network node for multicast transmissions. For example, one or more user equipment (UEs) may be configured to transmit NACK feedback within allocated uplink resources in the event that a UE does not successfully receive (e.g., unsuccessfully decodes) one or more frames of a multicast transmission. When a UE does not successfully receive the one or more frames, the UE may transmit NACK feedback indicating the one or more frames that were unsuccessfully received. In some cases, a serving base station may store a set of frames of the multicast transmission (e.g., corresponding to the set of frames transmitted during a window) and, upon receiving the NACK feedback from one or more UEs, may retransmit the stored frames from the window as indicated by the received feedback. In such cases, the serving base station may retransmit frames that were indicated within the NACK feedback (e.g., frames unsuccessfully decoded by at least one UE) along with additional data in a subsequent multicast transmission, which may likewise be stored by the base station. Additionally or alternatively, the serving base station may delete frames after transmission, and the NACK feedback from respective UEs may be propagated to a network node (such as a user plane function (UPF)), and the network node may identify which frames are to be retransmitted (e.g., based on NACK feedback received from multiple UEs within one or more cells). The UPF may then direct the serving base station to retransmit the frames identified by the UPF.

A method of wireless communication at a UE is described. The method may include receiving a multicast transmission including a set of frames, attempting to decode multicast data within each frame of the set of frames, determining that multicast data within one or more respective frames from the set of frames has been unsuccessfully decoded, and transmitting a feedback message based on the determination, the feedback message including information associated with the respective one or more frames having the unsuccessfully decoded multicast data.

An apparatus for wireless communication at a UE is described. The apparatus may include a processor, memory in electronic communication with the processor, and instructions stored in the memory. The instructions may be executable by the processor to cause the apparatus to receive a multicast transmission including a set of frames, attempt to decode multicast data within each frame of the set of frames, determine that multicast data within one or more respective frames from the set of frames has been unsuccessfully decoded, and transmit a feedback message based on the determination, the feedback message including information associated with the respective one or more frames having the unsuccessfully decoded multicast data.

Another apparatus for wireless communication at a UE is described. The apparatus may include means for receiving a multicast transmission including a set of frames, attempting to decode multicast data within each frame of the set of frames, determining that multicast data within one or more respective frames from the set of frames has been unsuccessfully decoded, and transmitting a feedback message based on the determination, the feedback message including information associated with the respective one or more frames having the unsuccessfully decoded multicast data.

A non-transitory computer-readable medium storing code for wireless communication at a UE is described. The code may include instructions executable by a processor to receive a multicast transmission including a set of frames, attempt to decode multicast data within each frame of the set of frames, determine that multicast data within one or more respective frames from the set of frames has been unsuccessfully decoded, and transmit a feedback message based on the determination, the feedback message including information associated with the respective one or more frames having the unsuccessfully decoded multicast data.

Some examples of the method, apparatuses, and non-transitory computer-readable medium described herein may further include operations, features, means, or instructions for receiving downlink control information (DCI) that indicates scheduling allocation information for the feedback message, where the scheduling allocation information may be located within a downlink shared channel of the multicast transmission and transmitting the feedback message via an uplink channel in accordance with the scheduling allocation information.

In some examples of the method, apparatuses, and non-transitory computer-readable medium described herein, the scheduling allocation information may be encoded using a first coding scheme that may be different from a second coding scheme used for encoding a set of data on the downlink shared channel.

In some instances of the method, apparatuses, and non-transitory computer-readable medium described herein, the information associated with the respective one or more frames may indicate the one or more respective frames having the unsuccessfully decoded multicast data.

In some examples of the method, apparatuses, and non-transitory computer-readable medium described herein, the information associated with the respective one or more frames may indicate an index of the respective one or more frames having the unsuccessfully decoded multicast data.

Some examples of the method, apparatuses, and non-transitory computer-readable medium described herein may further include operations, features, means, or instructions for receiving a resource grant for a set of periodic resources used for transmitting the feedback message for a frame of the set of frames within a transmission time interval (TTI) and transmitting the feedback message via an uplink channel on at least one periodic resource of the set of periodic resources.

Some examples of the method, apparatuses, and non-transitory computer-readable medium described herein may further include operations, features, means, or instructions for receiving an indication of a UE group that the UE may be assigned to, identifying uplink resources for transmitting the feedback message based on the UE group; and, and transmitting the feedback message via an uplink control channel on the identified uplink resources.

In some examples of the method, apparatuses, and non-transitory computer-readable medium described herein, transmitting the feedback message may include operations, features, means, or instructions for transmitting the feedback message at a transmit time that may be shifted according to a time offset value that may be associated with the UE group.

Some examples of the method, apparatuses, and non-transitory computer-readable medium described herein may further include operations, features, means, or instructions for receiving an additional transmission including at least the unsuccessfully decoded multicast data.

In some examples of the method, apparatuses, and non-transitory computer-readable medium described herein, determining that the multicast data within the one or more respective frames may have been unsuccessfully decoded may include operations, features, means, or instructions for determining that a threshold number of frames to decode the received multicast transmission may have not been received, where the feedback message indicates a number of respective frames having the unsuccessfully decoded multicast data.

Some examples of the method, apparatuses, and non-transitory computer-readable medium described herein may further include operations, features, means, or instructions for receiving an additional transmission including at least the number of respective frames having the unsuccessfully decoded multicast data. In some examples of the method, apparatuses, and non-transitory computer-readable medium described herein, the multicast transmission may be encoded using a raptor code.

Some examples of the method, apparatuses, and non-transitory computer-readable medium described herein may further include operations, features, means, or instructions for transmitting the feedback message to a network node based on the determination, where the feedback message may be transmitted using a multicast automatic repeat request (ARQ) protocol layer, the method further including. In some examples of the method, apparatuses, and non-transitory computer-readable medium described herein, the network node includes a user plane function.

Some examples of the method, apparatuses, and non-transitory computer-readable medium described herein may further include operations, features, means, or instructions for receiving the multicast transmission from a first base station, performing a handover to a second base station, where the feedback message may be transmitted to the second base station based on the handover and receiving, from the second base station, at least the unsuccessfully decoded multicast data.

Some examples of the method, apparatuses, and non-transitory computer-readable medium described herein may further include operations, features, means, or instructions for receiving the multicast transmission from a first base station, performing a handover to a second base station, where the feedback message may be transmitted to a network node based on the handover and receiving, from the second base station, at least the unsuccessfully decoded multicast data.

Some examples of the method, apparatuses, and non-transitory computer-readable medium described herein may further include operations, features, means, or instructions for transmitting, to a base station, a request for uplink resources for transmitting the feedback message, where the request may be based on receiving the multicast transmission.

Some examples of the method, apparatuses, and non-transitory computer-readable medium described herein may further include operations, features, means, or instructions for receiving an indication of a set of parameters including a latency requirement, an ARQ window length, a number of frames during which the feedback message may be to be transmitted, a length of each frame of the set of frames, or a combination thereof. In some examples of the method, apparatuses, and non-transitory computer-readable medium described herein, the feedback message includes a NACK.

A method of wireless communication at a base station is described. The method may include transmitting, to a set of UEs, a multicast transmission including a set of frames, storing multicast data from a set of frames of the set of frames transmitted during a transmission window, receiving, from the set of UEs, respective feedback messages including information associated with one or more frames within the transmission window having multicast data unsuccessfully decoded by the one or more UEs, and transmitting, to the set of UEs and based on the respective feedback messages, an additional transmission including at least the stored multicast data that has been unsuccessfully decoded.

An apparatus for wireless communication at a base station is described. The apparatus may include a processor, memory in electronic communication with the processor, and instructions stored in the memory. The instructions may be executable by the processor to cause the apparatus to transmit, to a set of UEs, a multicast transmission including a set of frames, store multicast data from a set of frames of the set of frames transmitted during a transmission window, receive, from the set of UEs, respective feedback messages including information associated with one or more frames within the transmission window having multicast data unsuccessfully decoded by the one or more UEs, and transmit, to the set of UEs and based on the respective feedback messages, an additional transmission including at least the stored multicast data that has been unsuccessfully decoded.

Another apparatus for wireless communication at a base station is described. The apparatus may include means for transmitting, to a set of UEs, a multicast transmission including a set of frames, storing multicast data from a set of frames of the set of frames transmitted during a transmission window, receiving, from the set of UEs, respective feedback messages including information associated with one or more frames within the transmission window having multicast data unsuccessfully decoded by the one or more UEs, and transmitting, to the set of UEs and based on the respective feedback messages, an additional transmission including at least the stored multicast data that has been unsuccessfully decoded.

A non-transitory computer-readable medium storing code for wireless communication at a base station is described. The code may include instructions executable by a processor to transmit, to a set of UEs, a multicast transmission including a set of frames, store multicast data from a set of frames of the set of frames transmitted during a transmission window, receive, from the set of UEs, respective feedback messages including information associated with one or more frames within the transmission window having multicast data unsuccessfully decoded by the one or more UEs, and transmit, to the set of UEs and based on the respective feedback messages, an additional transmission including at least the stored multicast data that has been unsuccessfully decoded.

Some examples of the method, apparatuses, and non-transitory computer-readable medium described herein may further include operations, features, means, or instructions for transmitting, to a UE of the set of UEs, DCI that indicates scheduling allocation information for uplink resources allocated for a feedback message, the scheduling allocation information being located within a downlink shared channel of the multicast transmission, and where the uplink resources include an uplink channel.

In some examples of the method, apparatuses, and non-transitory computer-readable medium described herein, the scheduling allocation information may be encoded using a first coding scheme that may be different from a second coding scheme used for encoding a set of data on the downlink shared channel.

Some examples of the method, apparatuses, and non-transitory computer-readable medium described herein may further include operations, features, means, or instructions for transmitting, to a UE of the set of UEs, a resource grant for a set of periodic resources allocated for transmitting a feedback message for one or more frames within the transmission window, where the set of periodic resources include one or more uplink channels.

Some examples of the method, apparatuses, and non-transitory computer-readable medium described herein may further include operations, features, means, or instructions for determining that the respective feedback messages from the one or more UEs may be to be received during two or more frames, grouping the set of UEs into a set of UE groups based on the determination, configuring time offset values associated with each UE group of the set of UE groups, where time offset values may be indicative of different uplink resources allocated for receiving the respective feedback messages and transmitting, to the set of UEs, an indication of the set of UE groups and the time offset values associated with each UE group.

Some examples of the method, apparatuses, and non-transitory computer-readable medium described herein may further include operations, features, means, or instructions for receiving a first set of feedback messages associated with a first UE group at a first transmit time and receiving a second set of feedback messages from a second UE group at a second transmit time that may be shifted from the first transmit time.

In some examples of the method, apparatuses, and non-transitory computer-readable medium described herein, receiving the respective feedback messages from the one or more UEs may include operations, features, means, or instructions for receiving a first feedback message from a first UE indicating a first frame having multicast data that may have been unsuccessfully decoded, receiving a second feedback message from a second UE indicating a second frame having multicast data that may have been unsuccessfully decoded and transmitting, within the additional transmission, the multicast data of the first frame and the second frame.

Some examples of the method, apparatuses, and non-transitory computer-readable medium described herein may further include operations, features, means, or instructions for determining a feedback period for receiving feedback from the set of UEs and transmitting the additional transmission subsequent to the feedback period.

Some examples of the method, apparatuses, and non-transitory computer-readable medium described herein may further include operations, features, means, or instructions for encoding the multicast transmission using a raptor code, where the respective feedback messages include an indication of a number of respective frames having multicast data that may have been unsuccessfully decoded, and where the additional transmission includes at least the number of respective frames having multicast data that may have been unsuccessfully decoded.

Some examples of the method, apparatuses, and non-transitory computer-readable medium described herein may further include operations, features, means, or instructions for performing a handover of a first UE from the set of UEs to a second base station and transmitting, to the second base station, the stored multicast data from the transmission window based on the handover.

Some examples of the method, apparatuses, and non-transitory computer-readable medium described herein may further include operations, features, means, or instructions for receiving, from a network node, an indication of a mapping of sequence numbers to frames and assigning a respective sequence number to each of the one or more frames based on the mapping.

A method of wireless communication at a network node is described. The method may include transmitting, to a set of base stations, multicast data to be transmitted to a set of UEs, receiving, from respective UEs of the set of UEs, feedback messages that each include an indication of one or more frames having the multicast data that has been unsuccessfully decoded by the respective UE, determining a set of multicast data that has been unsuccessfully decoded by at least one UE based on the received feedback messages, and transmitting, to at least one base station of the set of base stations, the set of multicast data via an additional broadcast transmission.

An apparatus for wireless communication at a network node is described. The apparatus may include a processor, memory in electronic communication with the processor, and instructions stored in the memory. The instructions may be executable by the processor to cause the apparatus to transmit, to a set of base stations, multicast data to be transmitted to a set of UEs, receive, from respective UEs of the set of UEs, feedback messages that each include an indication of one or more frames having the multicast data that has been unsuccessfully decoded by the respective UE, determine a set of multicast data that has been unsuccessfully decoded by at least one UE based on the received feedback messages, and transmit, to at least one base station of the set of base stations, the set of multicast data via an additional broadcast transmission.

Another apparatus for wireless communication at a network node is described. The apparatus may include means for transmitting, to a set of base stations, multicast data to be transmitted to a set of UEs, receiving, from respective UEs of the set of UEs, feedback messages that each include an indication of one or more frames having the multicast data that has been unsuccessfully decoded by the respective UE, determining a set of multicast data that has been unsuccessfully decoded by at least one UE based on the received feedback messages, and transmitting, to at least one base station of the set of base stations, the set of multicast data via an additional broadcast transmission.

A non-transitory computer-readable medium storing code for wireless communication at a network node is described. The code may include instructions executable by a processor to transmit, to a set of base stations, multicast data to be transmitted to a set of UEs, receive, from respective UEs of the set of UEs, feedback messages that each include an indication of one or more frames having the multicast data that has been unsuccessfully decoded by the respective UE, determine a set of multicast data that has been unsuccessfully decoded by at least one UE based on the received feedback messages, and transmit, to at least one base station of the set of base stations, the set of multicast data via an additional broadcast transmission.

Some examples of the method, apparatuses, and non-transitory computer-readable medium described herein may further include operations, features, means, or instructions for identifying a first base station from the set of base stations that is serving at least one of the respective UEs, where the set of multicast data may be transmitted to the identified first base station based on receiving the feedback messages.

In some examples of the method, apparatuses, and non-transitory computer-readable medium described herein, the set of multicast data may be transmitted to each of the set of base stations. Some examples of the method, apparatuses, and non-transitory computer-readable medium described herein may further include operations, features, means, or instructions for identifying respective feedback messages associated with multicast data transmitted by each base station of the set of base stations.

Some examples of the method, apparatuses, and non-transitory computer-readable medium described herein may further include operations, features, means, or instructions for determining that a first UE from the set of UEs may have been handed over from a first base station to a second base station, receiving a feedback message from the first UE indicating that one or more frames having the multicast data may have been unsuccessfully decoded by the first UE and transmitting the multicast data to the second base station based on the determination that the first UE may have been handed over.

In some examples of the method, apparatuses, and non-transitory computer-readable medium described herein, the feedback messages may be received using a multicast ARQ protocol layer. In some examples of the method, apparatuses, and non-transitory computer-readable medium described herein, the network node includes a UPF.

DETAILED DESCRIPTION

Figure 1:
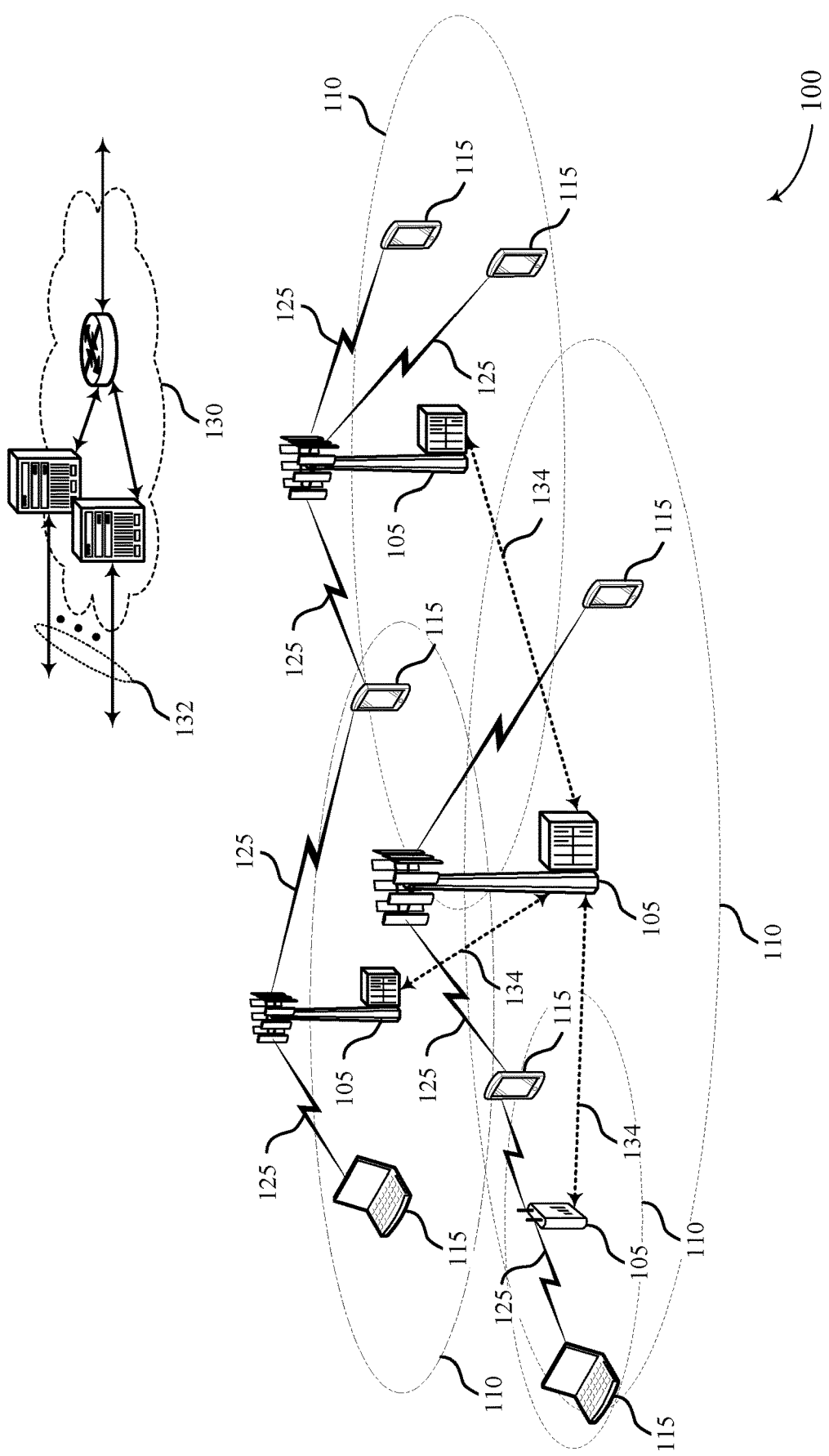
FIGS. 1 and 2 illustrate examples of wireless communications systems in accordance with aspects of the present disclosure.

In some wireless communications systems, base stations may support multicast streaming services (MSSs) and communicate with more than one user equipment (UE) via a multicast transmission. The multicast transmission may be used to broadcast data to multiple UEs. In some cases, the base station may use a portion of the available downlink bandwidth to broadcast multimedia data to some or all UEs within a coverage area. For example, wireless communications systems may be configured to broadcast mobile TV content, or to multicast live event coverage to UEs located near a live event, such as a concert or sporting event. In some cases, this may enable more efficient utilization of the bandwidth.

In some cases, however, one or more UEs may not successfully receive some content of a multicast transmission. For example, one or more UEs may experience an unreliable or noisy communications channel that creates errors in the multicast data received at the UE. In such cases, the UE may attempt to recover the data through forward error correction techniques provided by the coding of the multicast transmission. The UE may not have the ability to provide feedback to the base station for frames that are unsuccessfully decoded, which may affect the reliability of the system.

As described herein, multicast transmission reliability may be increased by allocating resources to enable UEs to transmit feedback messages regarding the multicast transmission. This may allow an opportunity for UEs to provide negative acknowledgment (NACK) feedback to a serving base station or other network node (e.g., a user plane function (UPF)) for multicast transmissions. In such cases, the UEs may be configured to transmit NACK feedback within the allocated uplink resources in the event that the UE does not successfully receive one or more frames of a multicast transmission. When the UE does not successfully receive the one or more frames, the UE may transmit NACK feedback indicating the one or more frames that were not successfully received. The base station or other network node may then determine which frames were not successfully received by each of the UEs intended to receive the frames.

Based on determining which frames from the multicast transmission were not successfully received, the base station may retransmit each of the frames indicated within the NACK feedback. In some examples, the base station may buffer a number of frames transmitted during a certain time period or window, and frames may be quickly and efficiently retrieved from the buffered information for retransmission. In some cases, the serving base station may retransmit frames that were indicated within the NACK feedback (e.g., frames that may not have been received successfully by each of the UEs) in a subsequent multicast or unicast transmission that also includes additional data.

In other examples, the base station may refrain from storing transmitted multicast frames, and instead rely on the network node to provide multicast data which is to be retransmitted. For instance, when the NACK feedback from one or more UEs is provided to the network node, the network node may determine which frames where unsuccessfully decoded by UEs served by a particular base station, or by UEs served by multiple base stations for the same multicast transmission. As such, the network node may send, to the base station(s), the frames to be retransmitted to at least the UEs that provided the NACK feedback.

Aspects of the disclosure are initially described in the context of wireless communications systems. Additional aspects of the disclosure are then described with respect to multicast transmission schemes, an additional wireless communication system, a protocol stack, and process flows. Aspects of the disclosure are further illustrated by and described with reference to apparatus diagrams, system diagrams, and flowcharts that relate to reliability for multicast transmissions.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of feedback from respective UEs that enhances multicast reliability. As an example, UEs 115 within wireless communications system 100 may provide an indication of multicast frames that were unsuccessfully decoded, which may be retransmitted in a subsequent multicast transmission, thereby enabling the UE 115 to obtain all of the multicast content from the network.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 (e.g., an NR system) may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100, base stations 105 may support MSSs and communicate with more than one UE 115 via a multicast transmission. The multicast transmission may be used to broadcast data to a set of UEs 115. In some cases, the base station 105 may utilize a portion of the available downlink bandwidth to broadcast multimedia data to some or all UEs 115 within a geographic coverage area 110. For example, wireless communications system 100 may be configured to broadcast mobile TV content, or to multicast live event coverage to UEs 115 located near a live event, such as a concert or sporting event. In some cases, this may enable more efficient utilization of the system bandwidth.

The multicast transmission reliability may be increased by allocating resources to UEs 115 to transmit feedback messages regarding the multicast transmission. This may allow an opportunity for UEs 115 to provide NACK feedback to a serving base station 105 or other network node for multicast transmissions. In such cases, the UEs 115 may be configured to transmit NACK feedback within the allocated uplink resources in the event that the UE 115 does not successfully receive one or more frames of a multicast transmission. When the UE 115 does not successfully decode the one or more frames, the UE 115 may transmit negative NACK feedback indicating the one or more frames that were not successfully decoded. The base station 105 or other network node may then determine which frames were not successfully received by each of the UEs 115 intended to receive the frames.

Based on determining which frames from the multicast transmission were not successfully received, the base station 105 may retransmit each of the frames indicated within the NACK feedback, which may have been stored in a transmission window at the time they were initially multicast. In some cases, the serving base station 105 may not retransmit frames that were not indicated within the NACK feedback (e.g., frames that may have been received successfully by each of the UEs 115) and may instead send a new transmission that also includes the missed frames indicated by the NACK feedback.

Figure 2:
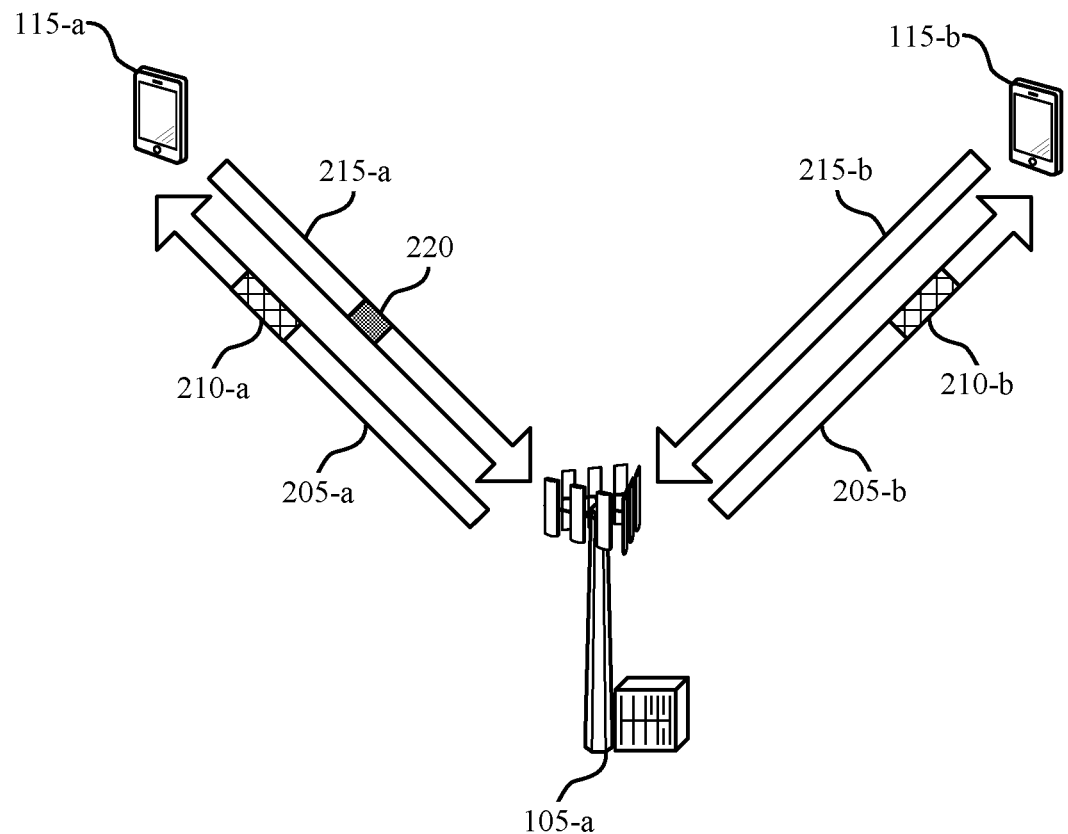

FIG. 2 illustrates an example of a wireless communications system 200 in accordance with aspects of the present disclosure. In some examples, wireless communications system 200 may implement aspects of wireless communications system 100. Wireless communications system 200 includes a base station 105-a and UEs 115-a and 115-b, which may be examples of corresponding base stations 105 and UEs 115 as described with reference to FIG. 1.

Wireless communications system 200 may support multicast transmissions to multiple UEs 115. For example, base station 105-a may utilize a portion of the available downlink bandwidth to broadcast multimedia data to some or all UEs 115 (e.g., including UE 115-a and UE 115-b) within a coverage area. For example, wireless communications system 200 may be configured to broadcast mobile TV content, or to multicast live event coverage to UEs 115-a and 115-b located near a live event, such as a concert or sporting event. In some cases, this may enable more efficient utilization of the bandwidth.

Accordingly, base station 105-a may send multicast transmission 210 to UEs 115-a and 115-b via a forward link 205. In some cases, however, UEs 115-a and/or 115-b may lose one or more frames of multicast transmission 210. That is, UEs 115-a and/or 115-b may not receive one or more frames of multicast transmission 210 or may be unable to decode the frames of multicast transmission 210. For example, UE 115-*a* may not receive one or more frames of multicast transmission 210-*a* due to noisy conditions and/or interference experienced at UE 115-*a*. Additionally or alternatively, UE 115-*a* may receive each of the frames of the multicast transmission 210, but may receive one or more of the frames with errors. In such cases, UE 115-*a* may determine that there was an error decoding the multicast transmission 210-*a* and may transmit NACK feedback 220 via reverse link 215 to base station 105-*a* indicating the error. Base station 105-*a* may retransmit one or more frames of multicast transmission 210 to UE 115-*a*, where the frames that are retransmitted may have been stored by base station 105-*a* during a previous transmission window (e.g., when originally transmitted). In some instances, base station 105-*a* may retransmit the one or more frames as a multicast transmission, in which case UE 115-*b* may also receive the one or more retransmitted frames.

The multicast transmission 210 may be encoded with raptor codes. In this example, the multicast transmission 210 may be encoded such that UEs 115 may be able to successfully decode an n-byte transmission if the UEs 115 receive k distinct bytes of the multicast transmission 210, where k may be a number of bytes less than n (e.g., k may be 100 and n may be 1000 such that UEs 115 may be able to decode a 1000 byte multicast transmission 210 after receiving 100 distinct bytes). For example, multicast transmission 210 may be a 1000 byte file download from a multimedia broadcast multicast service (MBMS), where raptor codes may have been used to encode the file at a BM-SC such that each UE 115 may successfully decode the file after receiving 100 distinct bytes. Base station 105-*a* may transmit 200 distinct bytes of the 1000 byte file to UEs 115 in multicast transmission 210. UE 115-*a* may receive 75 distinct bytes of the multicast transmission 210-*a* while UE 115-*b* may receive 150 distinct bytes of the multicast transmission 210 *b*. Because UE 115-*a* only received 75 bytes, UE 115-*a* may not be able to successfully decode multicast transmission 210-*a*. Therefore, UE 115-*a* may transmit NACK feedback 220 to base station 105-*a*, thereby indicating to base station 105-*a* that UE 115-*a* is requesting retransmission of the portions of multicast transmission 210-*a* that were not received.

In some examples, base station 105-*a* may transmit 200 different bytes, distinct from the 200 bytes transmitted during multicast transmission 210, in a second transmission in response to NACK feedback 220. The second transmission may be a unicast transmission (e.g., to UE 115-*a*) or a multicast transmission (e.g., to UE 115-*a* and UE 115-*b*). This process may repeat until each of the UEs 115 have received the necessary number of distinct bytes to successfully decode the multicast transmission 210. There may be a latency associated with this as each NACK feedback 220 may result in base station 105-*a* retransmitting the same size multicast transmission. In some other examples, the NACK feedback 220 may include information associated with an the missed frames of multicast transmission 210 (e.g., an indication of a number of missed frames, or an indication of which frames were missed). Base station 105-*a* may, in response to receiving the NACK feedback 220, retransmit the missed frames or the number of frames missed in a second transmission. In some instances, the second transmission may be a unicast transmission to the UE 115-*a* associated with the missed frames of multicast transmission 210. In some other instances, the second transmission may be a multicast transmission that, in some cases, includes new frames, not included in multicast transmission 210. This example may be associated with less latency, as each retransmission may not retransmit the entire initial multicast transmission 221 and may instead, retransmit a subset of the initial multicast transmission 210 (e.g., corresponding to a subset of frames indicated by NACK feedback 220) in combination with new frames not transmitted in the initial multicast transmission 210.

Figure 3:
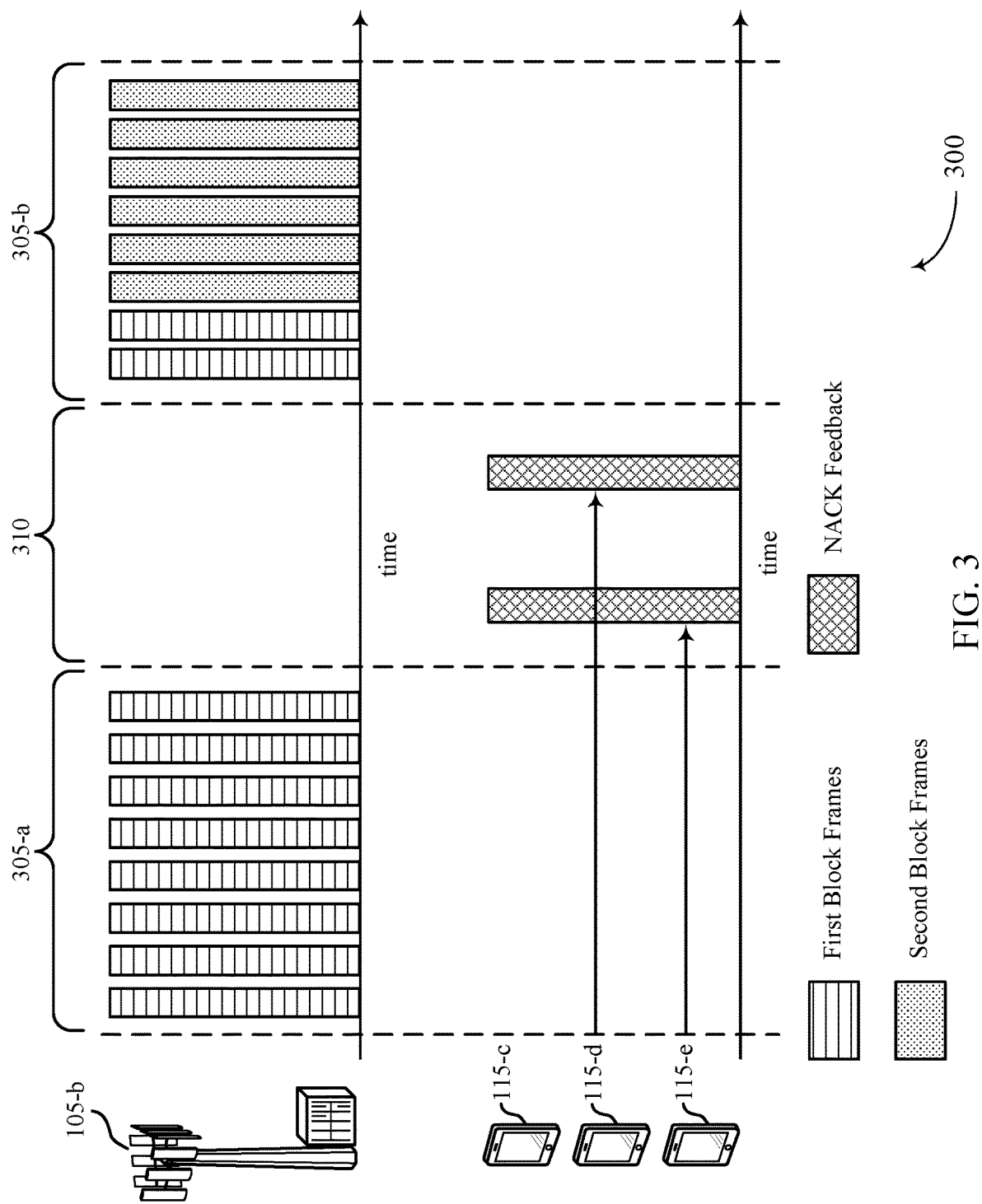
FIGS. 3 and 4 illustrate examples of multicast transmission schemes in accordance with aspects of the present disclosure.

FIG. 3 illustrates an example of a multicast transmission scheme 300 in accordance with aspects of the present disclosure. In some examples, multicast transmission scheme 300 may implement aspects of wireless communications system 100 and 200. For example, windows 305 may be used to store frames corresponding to multicast transmission 210. Wireless multicast transmission scheme 300 may include base station 105-*b* which may be an example of corresponding base stations 105 as described with reference to FIGS. 1 and 2. Multicast transmission scheme 300 may also include UEs 115 which may be examples of corresponding UEs 115 as described with reference to FIGS. 1 and 2.

The multicast transmission scheme 300 may be used as part of a multicast protocol data unit (MPDU) session that has been set up, for example, by base station 105-*b* to include UEs 115-*c*, 105-*d*, and 105-*e*. The base station 105-*b* may indicate a latency requirement for the multicast transmission scheme 300. The base station 105-*b* may further indicate an ARQ window 310 length (e.g., a number of frames for feedback) and a frame length for the multicast transmission scheme 300. Base station 105-*b* may then begin multicast transmissions to UEs 115.

Base station 105-*b* may transmit a first block of frames for a multicast transmission during the first window 305-*a*. Here, eight frames are shown within the first window 305-*a*, but a person skilled in the art would appreciate that more or less than eight frames may be included within window 305-*a*, and the number of frames shown are provided for illustrative clarity. The first block of frames may correspond to a first multicast transmission (e.g., may include aspects of multicast transmission 210 with respect to FIG. 2). The UEs 115 may be the intended recipients of the first multicast transmission within the first window 305-*a*. In the event that a UE 115 does not receive each of the transmitted frames, the UE 115 may transmit NACK feedback within the following ARQ window 310. Base station 105-*b* may store the frames for each window 305 of transmitted packets in order to retransmit frames within the window 305 if a UE 115 transmits a NACK for the window 305.

Base station 105-*b* may reserve reverse link resources (e.g., ARQ window 310) for each intended multicast recipient (e.g., UEs 115-*c*, 105-*d*, and 105-*e*) to send one or more NACK messages indicating lost frames (e.g., frames that may not be received or frames that may be received with error). The NACK feedback may be sent on an uplink channel during the ARQ window 310. For example, the NACK feedback may be sent on an uplink shared channel (UL-SCH) during the ARQ window 310, which may piggy back on (e.g., be transmitted with) previously-scheduled uplink frames or, alternatively, may be granted to the UEs 115 by base station 105-*b* based on a request for resources from the UEs 115. In some other examples, the NACK feedback may be sent on a dedicated uplink channel (e.g., by resources allocated to the UE 115). Base station 105-*b* may indicate the scheduling allocations for the individual UE 115 NACK transmissions. For example, base station 105-*b* may indicate which resources may be available for NACK feedback during the ARQ window 310.

In some instances, base station 105-b may use downlink control information (DCI) resources within a downlink control channel (DCCH) to indicate the NACK scheduling allocations. For example, base station 105-b may transmit a pointer within DCI resources pointing to a downlink shared channel (DL-SCH) which may contain the NACK scheduling allocations, which may limit the number of DCCH resources utilized (e.g., a pointer may require less resources than the scheduling allocations themselves). Base station 105-b may transmit the first block of frames of the multicast transmission within a same slot as the DL-SCH containing the NACK scheduling allocations. Here, the NACK scheduling allocation may be coded separately from any other data on the DL-SCH so that UEs 115 that fail to receive DL-SCH data (e.g., the multicast transmission within the first window 305-a) may still be able to receive the NACK scheduling allocations. In some other instances, base station 105-b may use a configured grant to indicate the NACK scheduling allocations. Here, base station 105-b may use a single configured grant to indicate the resources for more than one ARQ window 310. That is, the configured grant may grant the UE 115 periodic access to the uplink channel for transmitting NACK feedback (e.g., an UL-SCH, dedicated uplink resources). In some cases, the periodicity of the ARQ windows 310 may correspond to a periodicity of the window 305 for the multicast transmission.

Base station 105-b may transmit, via a multicast transmission, frames within a first window 305-a to the UEs 115. UE 115-c may receive each of the frames within the first multicast transmission transmitted during the first window 305-a. In some cases, UE 115-c may refrain from transmitting a NACK message within the ARQ window 310, thus indicating an acknowledgement (ACK) to base station 105-b that the frames stored in the first window 305-a were received. However, UEs 115-d and 105-e may not have received one or more of the first window 305-a frames properly. As such, the UEs 115-d and 105-e may transmit NACK feedback within ARQ window 310. In some examples, the NACK feedback may include a frame index in the NACK message corresponding to the one or more frames that a UE 115 did not receive in the first window 305-a. In some other examples, the NACK feedback may include a number of frames that a UE 115 did not receive, such as in cases where raptor codes are used to encode the multicast transmission. Raptor codes may be used to encode the first window 305-a of frames. Here, the UE 115 may not need a specific frame retransmitted but rather a certain number of frames retransmitted. In some implementations, the frame block size may be less than or equal to a size of the ARQ window 310.

UE 115-d and UE 115-e may each indicate a frame index or a number of frames in their NACK feedback messages corresponding to lost frames. In response, base station 105-b may retransmit the lost frames. For example, UE 115-d may indicate the third frame as being lost while UE 115-e may indicate the sixth frame as being lost. In the second window 305-b, base station 105-b may transmit the lost frames from the first window 305-a (e.g., the third frame and the sixth frame). In another example, UE 115-d may indicate, within ARQ window 310, that it lost two frames while UE 115-e may indicate that it lost one frame. In response, base station 105-b may retransmit, within the second window 305-b, two frames (e.g., the largest number of frames that were lost by a single UE 115) corresponding to data within the first window frames. The two frames may contain distinct bytes such that UEs 115-d and 115-e may receive enough distinct bytes corresponding to the data within the first block of frames to decode the data successfully. Base station 105-b may not transmit any frames outside of the first block of frames transmitted within the first window 305-a until the end of ARQ window 310. That is, base station 105-b may not transmit any frames after the first window 305-a until each of the UEs 115 has had an opportunity to transmit a NACK feedback message.

In some examples, base station 105-b may multicast the retransmitted frames. In this example, UE 115-c may receive two retransmitted frames from the first block frames within the second window 305-b despite having received each of the frames in the first window 305-a. In some other examples, base station 105-b may determine to retransmit the lost frames using a unicast transmission. In this example, base station 105-b may transmit, via a unicast transmission, the lost frames to each of the UEs 115 corresponding to the frames indicated within each NACK feedback message. For example, if UE 115-d indicates the third frame as being lost and UE 115-e indicates the sixth frame as being lost, base station 105-b may transmit the third frame to UE 115-d and the sixth frame to UE 115-e. In another example, if UE 115-d indicates that it lost two frames while UE 115-e indicates that it lost one frame, base station 105-b may transmit two additional frames to UE 115-d and one additional frame to UE 115-e. In the event that the UEs 115-d and/or 105-e have higher data rate capacities (e.g., higher than UE 115-c), the unicast transmissions may be transmitted at a higher data rate than the multicast transmissions. In this event, transmitting the lost frames using unicast transmissions may require fewer resources than transmitting the lost frames using a multicast transmission.

Base station 105-b may transmit frames containing new data (e.g., the second block frames) within the second window 305-b after retransmitting the lost frames at the beginning of the second window 305-b. In this way, base station 105-b may provide reliability to the multicast transmission (e.g., by retransmitting lost frames) while minimizing associated latency (e.g., by retransmitting only what the UEs 115 may not have received initially).

Figure 4:
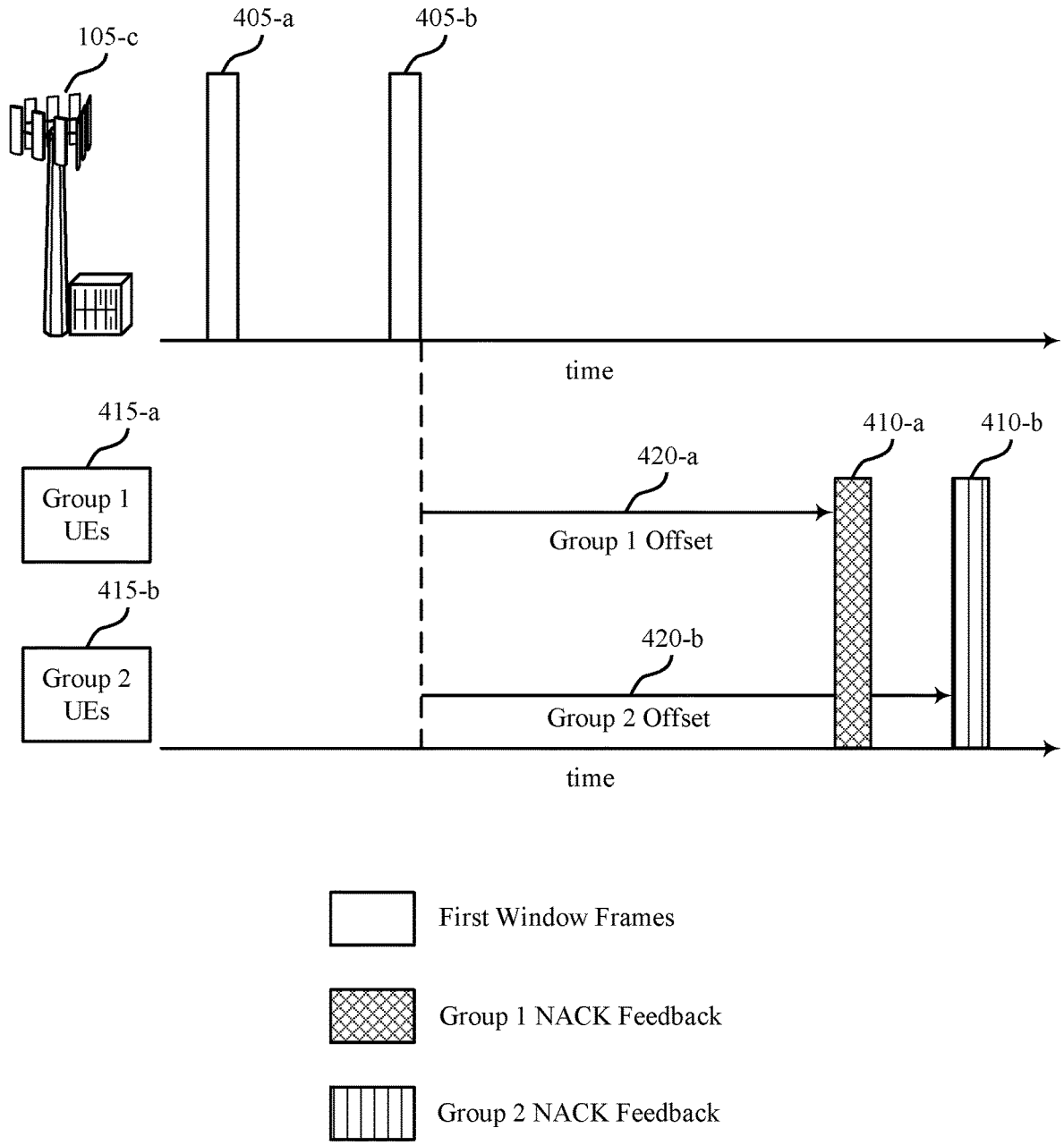

FIG. 4 illustrates an example of a multicast transmission scheme 400 in accordance with aspects of the present disclosure. In some examples, multicast transmission scheme 400 may implement aspects of wireless communications system 100. In some examples, multicast transmission scheme 400 may implement aspects multicast transmission scheme 300 and wireless communications system 100 and 200. For example, multicast frames 405-a and 405-b may include aspects of frames within the block of frames transmitted within windows 305. Multicast transmission scheme 400 may include base station 105-c which may be an example of corresponding base stations 105 as described with reference to FIGS. 1, 2, and 3. Multicast transmission scheme 400 may also include UEs 115 which may be examples of corresponding UEs 115 as described with reference to FIGS. 1, 2, and 3.

The multicast transmission scheme 400 may be a part of an MPDU session that has been set up by base station 105-c to include two or more UEs 115. The UEs 115 may be grouped into two groups 415, where the groups determine certain NACK feedback parameters for the UEs 115 within each group 415. While two groups 415 are shown here, a person skilled in the art would appreciate that UEs 115 may be grouped into one group or more than two groups. Base station 105-c may indicate a latency requirement for the multicast transmission scheme 400. Base station 105-c may then begin multicast transmissions to the UEs 115 within the UE groups 415.

Base station 105-c may transmit multicast frames 405 to some intended recipients such as the UEs 115 within the UE groups 415. In the event that a UE 115 does not receive one of the transmitted frames, the UE 115 may transmit NACK feedback 410 to base station 105-c. Base station 105-c may reserve reverse link resources for each UE group 415 to send one or more NACK messages indicating lost frames (e.g., frames that may not be received or frames that may be received with error). The NACK feedback 410 may be sent on an uplink control channel (ULCCH) such that each group 415 may be allotted one or more slots for NACK feedback. The NACK feedback 410 may indicate a lost multicast frame 405 based on the time at which the NACK feedback 410 is sent. For example, each group 415 may be assigned an offset time 420 such that a NACK, transmitted at the offset time 420 after the multicast frame 405, may indicate a NACK for the multicast frame 405.

In some cases, a single slot may be sufficient to support the number of UEs 115 receiving the multicast transmission. In this example, there may be only one "group" 415 of UEs 115, where each of the UEs 115 within the single group may transmit NACK feedback 410 within the single slot. In some other cases, there may be too many UEs 115 to transmit NACK feedback 410 within a single ULCCH slot. In this case, the UEs 115 may be divided into more than one group 415, where each group 415 of UEs 115 may be provided with a distinct offset time 420. For example, the UEs 115 of the first group 415-a may utilize the group 1 offset 420-a while the UEs 115 of the second group 415 b may utilize the group 2 offset 420-b.

Here, at least one of the UEs 115 within both the first group 415-a and the second group 415-b may have failed to receive multicast frame 405-b. The at least one UE 115 within group 415-a may transmit NACK feedback 410-a at offset time 420-a after the transmission of multicast frame 405-b. The at least one UE 115 within group 415-b may transmit NACK feedback 410-b at offset time 420-b after the transmission of multicast frame 405-b. Base station 105-c may receive NACK feedback 410-a and 410-b and determine that at least one UE 115 within both groups 415 may have lost multicast frame 405-b (e.g., multicast frame 405-b may not have been received by a UE 115, or may have included errors such that a decoding attempt by the UE 115 was unsuccessful). In response, base station 105-c may retransmit the lost frames (e.g., multicast frame 405-b). Base station 105-c may transmit multicast frames 405 containing new data after retransmitting the lost frames indicated within NACK feedback 410. In this way, base station 105-c provide reliability for the multicast transmission scheme 400 (e.g., by retransmitting lost frames) while minimizing associated latency (e.g., by selectively retransmitting the lost frames).

Figure 5:
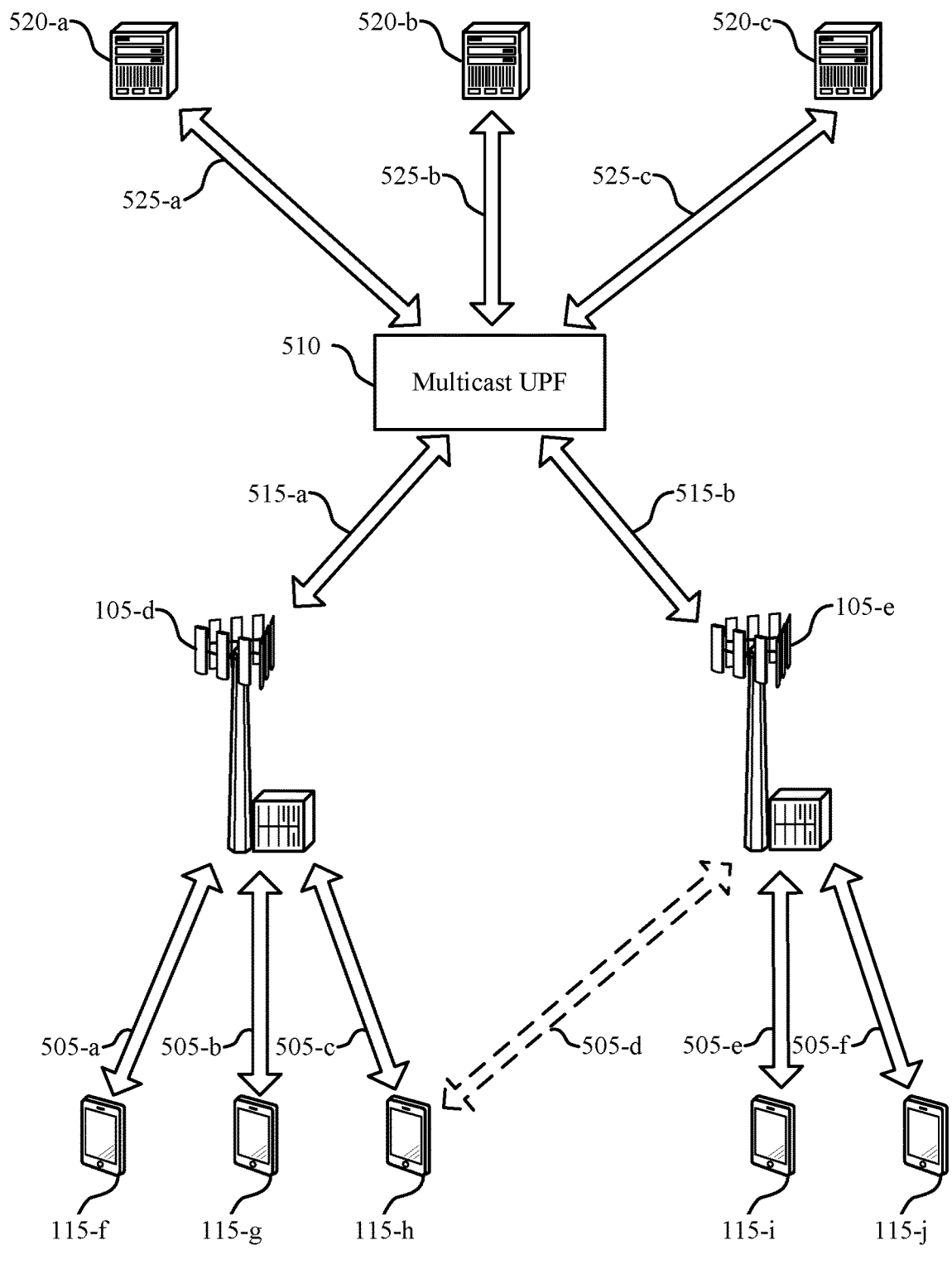
FIG. 5 illustrates an example of a wireless communications system in accordance with aspects of the present disclosure.

FIG. 5 illustrates an example of a wireless communications system 500 in accordance with aspects of the present disclosure. In some examples, wireless communications system 500 may implement aspects of wireless communications systems 100 and 200. Further, communication links 505 illustrated in wireless communications system 500 may utilize aspects of multicast transmission schemes 300 and 400. Wireless communications system 500 includes base stations 105-d and 105-e, which may be examples of corresponding base stations 105 as described with reference to FIGS. 1, 2, 3, and 4. Wireless communications system 500 includes UEs 115-f, 115-g, 115-h, 115-i, and 115-j, which may be examples of corresponding UEs 115 as described with reference to FIGS. 1, 2, 3, and 4.

Base stations 105-d and 105-e may be multicasting to more than one UE 115 via communication links 505. For example, base station 105-d may be multicasting to UEs 115-f, 115-g, and 115-h while base station 105-e may be multicasting to UEs 115-i and 115-j. Each base station 105 may be in communication with multicast UPF 510, which may in turn be in communications with one or more content providers 520. In some cases, the base stations 105 may propagate, via communication links 515, any NACK feedback messages from UEs 115 during multicast transmissions to multicast UPF 510. The multicast UPF 510 may determine, based on communications via communication links 525 with content providers 520, to retransmit lost multicast transmission frames (e.g., frames that may not be received or frames that may be received with error) to UEs 115. That is, content providers 520 may indicate whether the UEs 115 are to receive retransmissions for the multicast transmissions.

The base stations 105 may transmit a block of frames for a multicast transmission to UEs 115. Although each of the UEs 115 may be the intended recipients of the block for frames, one or more UEs 115 may not receive each frame within the block of frames. The UEs 115 that do not receive each frame may transmit NACK feedback according to multicast transmissions schemes discussed above via communication links 525 to its serving base station 105. Base stations 105 may propagate this NACK feedback to multicast UPF 510 while not buffering the previously transmitted block of frames for potential retransmissions. Multicast UPF 510 may receive, from one or more base stations 105, NACK feedback messages regarding each block of frames for a multicast transmission. For example, both UE 115-f and UE 115-j may not receive each of the frames within the block and therefore, may send a NACK feedback message to base stations 105-d and 105-e respectively. Base stations 105 may propagate the NACK feedback message to multicast UPF 510 by communication links 515. The NACK feedback messages from base stations 105-d and 105-e may indicate that a UE 115 failed to receive a certain frame or a specific number of frames.

Multicast UPF 510 may not track NACK feedback messages according to individual UEs 115. In some cases, multicast UPF 510 may evaluate each received NACK feedback messages according to its corresponding base station 105-d. In this case, multicast UPF 510 may send a unique retransmission request to each base station 105-d and 105-e, where the retransmission request includes the frames corresponding the frame index or number of frames indicated in the NACK feedback messages for that base station. In some other cases, multicast UPF 510 may evaluate the received NACK feedback messages collectively. In this case, multicast UPF 510 may send the same retransmission request to each base station 105-d and 105-e, where the retransmission request includes the frames corresponding to the lost frame indices and/or number of lost frames from each of the received NACK feedback messages. Base stations 105 may receive the retransmission request from multicast UPF 510. In response, base stations 105 may include the frames from the retransmission request (e.g., frames from the initial block of frames) in a next multicast transmission window to UEs 115.

UE 115-h may be mobile and moving from a coverage area associated with the first base station 105-d to a different coverage area associated with a second base station 105-e. UE 115-h may be handed over from base station 105-d to base station 105-e after receiving a block of frames as part of a multicast transmission. UE 115-h may determine, after being handed over to base station 105-e, one or more frames may not have received. UE 115-h may transmit a NACK feedback message to base station 105-*e* indicating the lost frames or number of lost frames. In some cases (e.g., when NACK feedback is propagated from base stations 105 to multicast UPF 510), a multicast UPF 510 may enable retransmissions for UEs 115 undergoing the handover procedure. For example, base station 105-*e* may propagate the NACK feedback message to multicast UPF 510 (e.g., via 515 *b*). Multicast UPF 510 may accordingly transmit a retransmission request to base station 105-*e* with the frames or number of frames indicated within the NACK feedback message.

In some other cases (e.g., when NACK feedback is not propagated from base stations 105 to multicast UPF 510), base stations 105-*e* may enable retransmissions for UEs 115 undergoing handover procedures. In one example, base station 105-*e* may be transmitting the same multicast transmissions as base station 105-*d* (e.g., base station 105-*e* may have an already active MSS). In this example, there may be a method for frame referencing that may be common or known between base stations 105-*d* and 105-*e*. That is, base stations 105-*d* and 105-*e* may determine the correct frames or number of frames for retransmission based on a same NACK feedback message. Base stations 105-*d* and 105-*e* may each send frames with a sequence number. In some cases, base stations 105-*d* and 105-*e* may coordinate the frame sequence numbers, which may ensure that feedback received from a handed-over UE 115 regarding an unsuccessfully decoded frame is consistent between cells (e.g., where the feedback indicate the same frame in both cells, as compared to cases where there may be a mismatch between sequence numbers in frames from respective base stations 105). The sequence numbers used by base station 105-*d* and 105-*e* may be mapped from sequence numbers provided by a network node (such as, multicast UPF 510). For example, multicast UPF 510 may transmit an indication of sequence numbers to be used for mapping frames to sequence numbers. Base stations 105-*d* and 105-*e* may receive the indication of the sequence numbers and utilize the UPF-provided sequence numbers when multicasting frames to the UEs 115 served by each base station 105.

In another example, base station 105-*e* may not be transmitting the same multicast transmission as base station 105-*d* (e.g., UE 115-*h* may be the first UE 115 served by base station 105-*e* with the MSS). In this example, base station 105-*e* may receive the NACK feedback message from UE 115-*h* and may forward the NACK feedback message to base station 105-*d*. In response, base station 105-*d* may forward the indicated frames to base station 105-*e* for retransmission. The base station 105-*d* may have the indicated frames buffered or saved for potential retransmissions to its own UEs 115 (e.g., UEs 115-*f* and 11-5-*g*). For either example, base station 105-*e* may transmit the frames for retransmission to UE 115-*h*.

Figure 6:
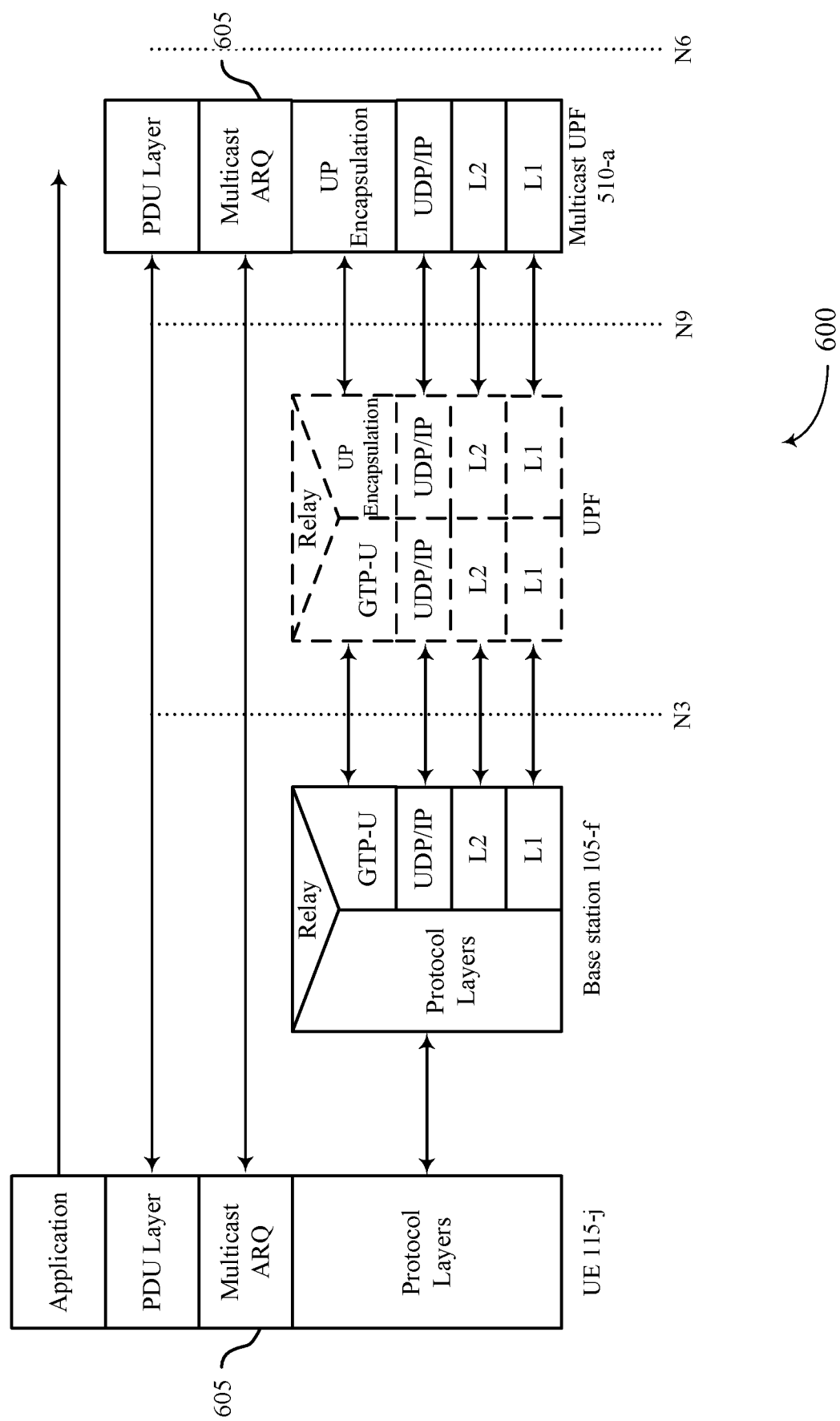
FIG. 6 illustrates an example of a protocol stack in accordance with aspects of the present disclosure.

FIG. 6 illustrates an example of a protocol stack 600 in accordance with aspects of the present disclosure. In some examples, protocol stack 600 may implement aspects of wireless communications system 100. For example, protocol stack 600 may be utilized by UEs 115, base stations 105, and network nodes, such as a UPF (which may be examples of the corresponding devices described with reference to FIGS. 1-5). As an example, protocol stack 600 may be utilized by UE 115-*j*, base station 105-*f*, and multicast UPF 510-*a* for the transmission of NACK feedback, such as described herein with reference to FIG. 5.

In some cases, UE 115-*j* may be configured to transmit NACK feedback for unsuccessfully decoded frames of a multicast transmission. As discussed above, the NACK feedback may be propagated from a UE 115 to multicast UPF 510-*a*. Here, the protocol stack 600 may include a multicast ARQ layer 605. Multicast ARQ layer 605 may allow for ARQ transmissions (e.g., NACK transmissions) between UE 115-*j* and multicast UPF 510-*a*. Further, multicast ARQ layer 605 may act as a protocol layer over a PDCP layer.

Figure 7:
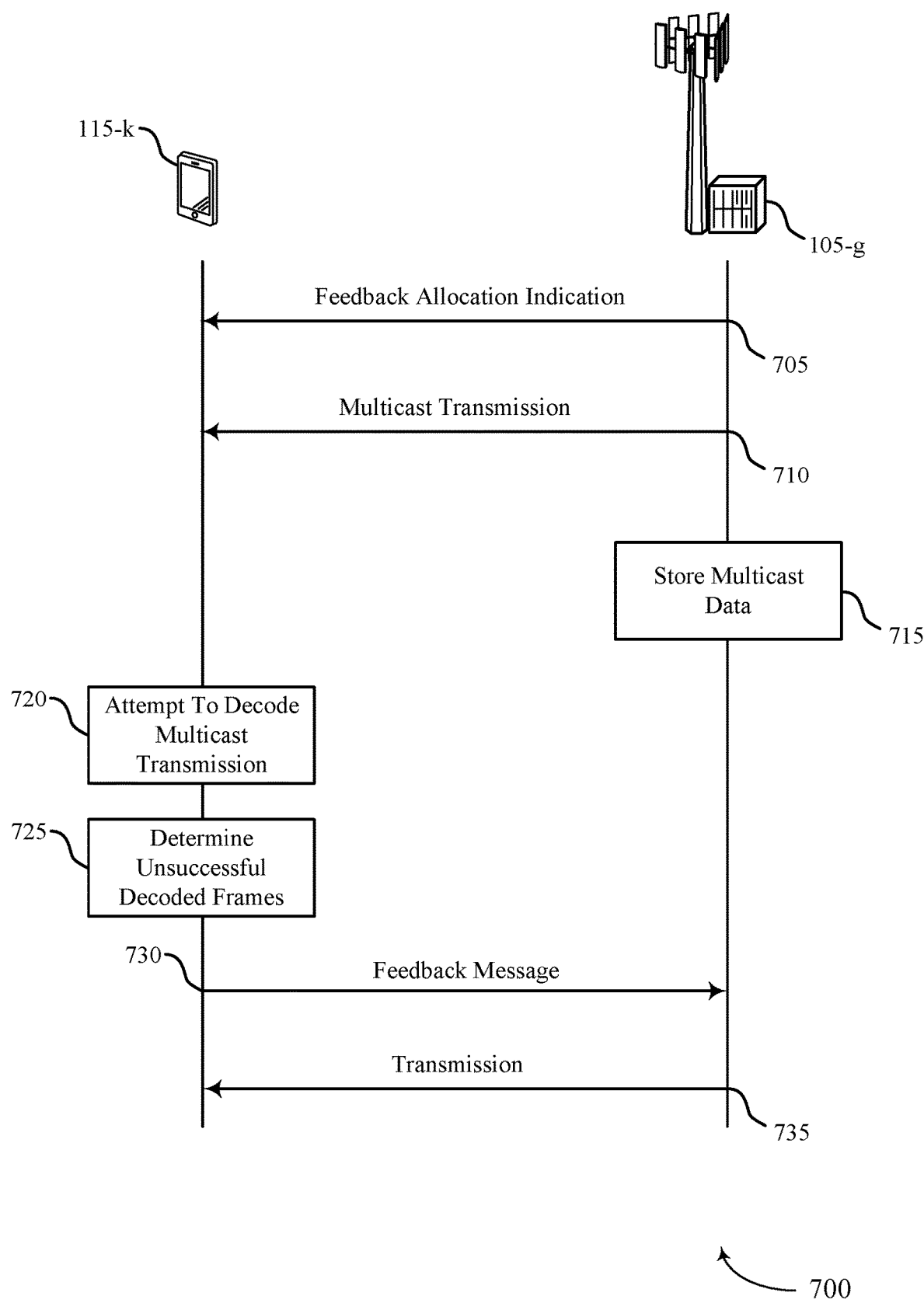
FIGS. 7 and 8 illustrate examples of process flows in a system in accordance with aspects of the present disclosure.

FIG. 7 illustrates an example of a process flow 700 in a system in accordance with aspects of the present disclosure. In some examples, process flow 700 may implement aspects of wireless communications system 100,200, and/or 500. Process flow 700 may include a base station 105-*g* and a UE 115-*k*, which may be examples of corresponding devices as described with reference to FIGS. 1-6. In the following description of the process flow 700, the operations between UE 115-*k* and base station 105-*g* may be performed in different orders or at different times. Certain operations may also be left out of the process flow 700, or other operations may be added to the process flow 700. It is to be understood that while UE 115-*k* and base station 105-*g* are shown performing a number of the operations of process flow 700, any wireless device may perform the operations shown.

At 705, base station 105-*g* may transmit a feedback allocation indication to UE 115-*k*. In some examples, the feedback allocation indication may include DCI that indicates scheduling allocation information for a feedback message. The scheduling allocation information may be located within a downlink shared channel of a multicast transmission. In some other examples, the feedback allocation indication 705 may include a resource grant for a set of periodic resources used for transmitting the feedback message for a frame of the set of frames within a TTI. The periodic resources may include one or more UL-SCHs. Additionally or alternatively, the periodic resources may include one or more uplink resources dedicated to UE 115-*k*.

In some other examples, base station 105-*g* may determine that the respective feedback messages from one or more UEs may be received during two or more frames. Here, the feedback allocation indication may include base station 105-*g* transmitting an indication of a UE group that the UE 115-*k* is assigned to. UE 115-*k* may then identify uplink resources for transmitting the feedback message based on the UE group. In some cases, the uplink resources may include an UL-SCH. In some other cases, the uplink resources may include uplink channel resources dedicated to UE 115-*k*. UE 115-*k* may identify which of the uplink resources based on an offset time, which may be configured by base station 105-*g* to be associated with each UE group, and where the offset time value may indicate different uplink resources allocated for the feedback messages of different UE groups. That is, UE 115-*k* may be allocated feedback resources for transmitting a feedback message at a transmit time that may be shifted according to the time offset associated with the UE group.

Base station 105-*g* may further transmit an indication of a set of parameters including a latency requirement, an ARQ window length, a number of frames during which the feedback message is to be transmitted, a length of each frame of the set of frames, or a combination thereof.

At 710, base station 105-*g* may transmit a multicast transmission to UE 115-*k*. Although not shown here, a person of reasonable skill in the art may understand that base station 105-*g* may transmit the multicast transmission to a set of UEs 115 including at least UE 115-*k*. In some cases, the multicast transmission may include a set of frames. In some instances, the multicast transmission may be encoded using a raptor code. In some implementations, UE 115-*k* may transmit a request for uplink resources for transmitting the feedback message, where the request is based on receiving the multicast transmission. In some other implementations, base station 105-g may transmit scheduling allocation information for feedback messaging within a downlink shared channel of the multicast transmission. In this implementation, the scheduling allocation information may be encoded using a coding scheme that is different from a second coding scheme used for encoding a set of data on the downlink shared channel (e.g., the scheduling allocation information and multicast data may be encoded with different coding schemes).

At 715, base station 105-g may store the multicast data of the set of frames of the set of frames transmitted during a transmission window. At 720, UE 115-k may attempt to decode the multicast data within each frame of the multicast transmission.

At 725, UE 115-k may determine that multicast data within one or more frames from the multicast transmission has been unsuccessfully decoded. In some cases (e.g., when the multicast transmission is encoded using a raptor code), determining that multicast data has been unsuccessfully decoded may include UE 115-k determining that a threshold number of frames to decode the received multicast transmission have not been received.

At 730, UE 115-k may transmit a feedback message to base station 105-g based on determining that multicast data may have been unsuccessfully decoded. The feedback message may include information associated with the one or more frames that have been unsuccessfully decoded. For example, the information may include an indication of the respective one or more frames having the unsuccessfully decoded multicast data (e.g., the feedback message may include a NACK). In some cases, UE 115-k may transmit the feedback message according to the feedback allocation indication received at 705. In some examples, the feedback message may indicate an index of the respective one or more frames that may have been unsuccessfully decoded multicast data. In some other examples, the feedback message may indicate a number of frames that have been unsuccessfully decoded.

In some implementations, base station 105-g may receive feedback messages from more than one UE 115 (e.g., base station 105-g may transmit the multicast transmission to more than one UE 115). Here, base station 105-g may receive a first feedback message from UE 115-k and a second feedback message from a second UE. In some cases (e.g., when UE 115-k may transmit the feedback message according to an offset time correlating to a UE group), base station 105-g may receive first feedback messages associated with a first UE group at a first transmit time and second feedback messages associated with a second UE group at a second transmit time. In some examples, the first and second feedback messages may indicate a first frame having multicast data that has been unsuccessfully decoded and a second frame having multicast data that has been unsuccessfully decoded respectively.

Base station 105-g may be associated with a network node (e.g., a network node including a multicast UPF). Here, UE 115-k may transmit the feedback message, via base station 105-g, to the network node, where the feedback message may be transmitted using a multicast ARQ protocol layer.

In some cases, UE 115-k may undergo a handover procedure from base station 105-g to a second base station 105 prior to transmitting a feedback message but after receiving the multicast transmission from base station 105-g. Here, UE 115-k may transmit the feedback message to the second base station 105 based on the handover. In a case where the second base station 105 is associated with a network node, the second base station 105 may propagate the feedback message to the network node. That is, UE 115-k may transmit the feedback message to the network node based on the handover. In some cases, base station 105-g may transmit stored multicast data from the transmission window to the second base station 105 based on the handover.

At 735, base station 105-g may transmit an additional transmission to UE 115-k. UE 115-k may receive this additional transmission, where the additional transmission may include at least the unsuccessfully decoded multicast data. For example, the additional transmission may include the number of frames that may have been unsuccessfully decoded multicast data. In another example, the additional transmission may include the frames indicated within the feedback message as being unsuccessfully decoded multicast data. In some cases, base station 105-g may determine a feedback period for receiving feedback from one or more UEs 115 and may transmit the additional data after the feedback period. In some implementations (e.g., when UE 115-k has been handed over from base station 105-g to another base station 105) the second base station 105 may transmit the additional transmission to UE 115-k. The additional transmission may be an additional multicast transmission. Alternatively, the additional transmission may be a unicast transmission (e.g., directed to UE 115-k).

Figure 8:
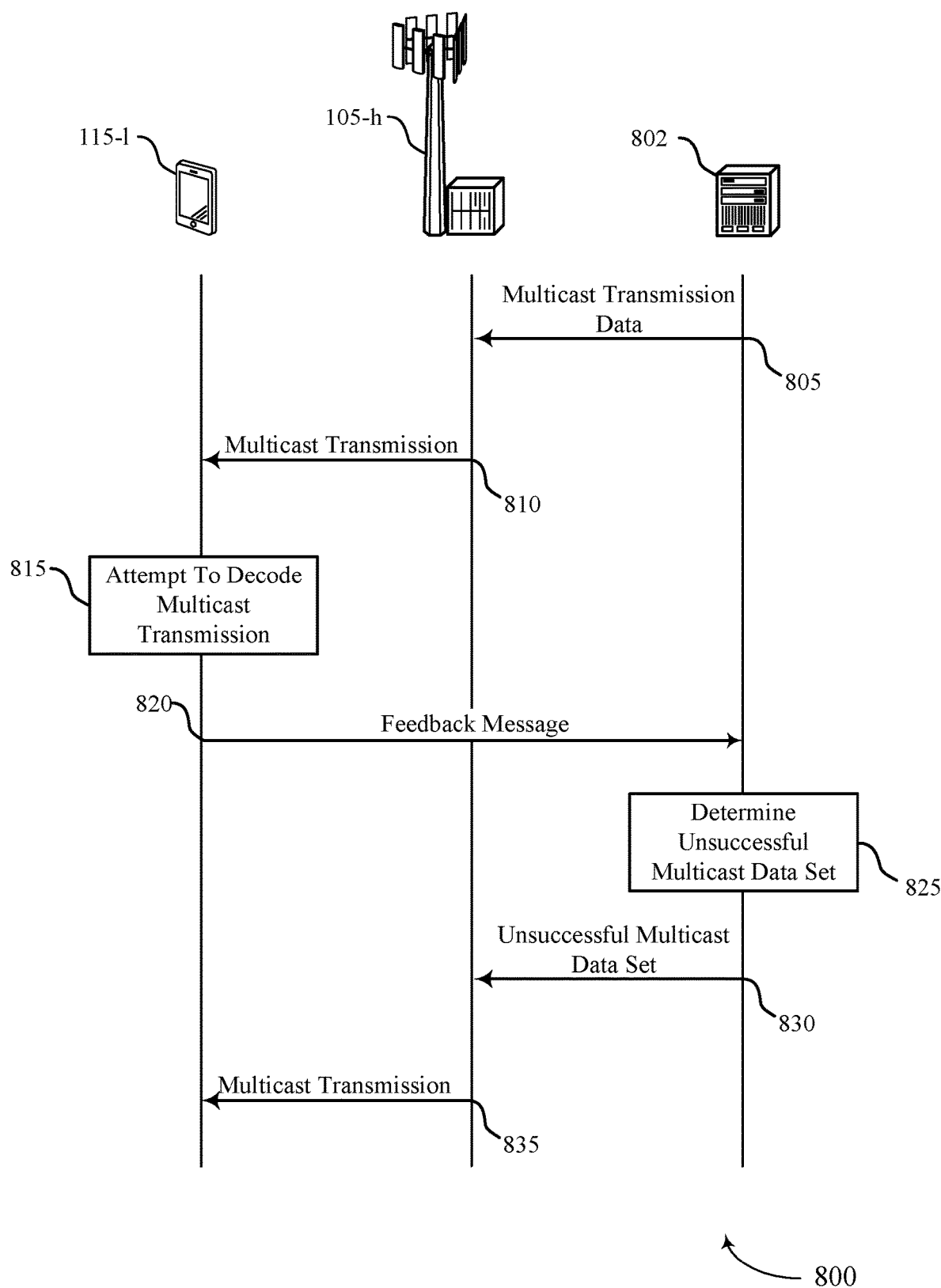

FIG. 8 illustrates an example of a process flow 800 in accordance with aspects of the present disclosure. In some examples, process flow 800 may implement aspects of wireless communications systems 100, 200, and/or 500. Process flow 800 may include base station 105-h, UE 115-1, and network node 802 (e.g., a UPF), which may be examples of corresponding devices as described with reference to FIGS. 1-6. Process flow may implement aspects of process flow 700. For example, the multicast transmission at 810 may include aspects of the multicast transmission at 710. In another example, UE 115-1 attempting to decode the multicast transmission at 815 may include aspects of UE 115-k attempting to decode the multicast transmission 715 and determining the unsuccessful decoded frames 720. In the following description of the process flow 800, the operations between UE 115-1, base station 105-h, and network node 802 may be performed in different orders or at different times. Some operations may also be left out of the process flow 800, or other operations may be added to the process flow 800. It is to be understood that while UE 115-k, base station 105-g, and network node 802 are shown performing a number of the operations of process flow 800, any wireless device may perform the operations shown.

At 805, network node 802 may transmit multicast transmission data to base station 105-h. The network node 802, which may include a multicast UPF, may transmit multicast data to be transmitted to multiple UEs 115. Here, network node 802 is shown transmitting the multicast data to a single base station 105-h. However, network node 802 may further transmit the multicast data to one or more additional base stations 105. Network node 802 may identify base station 105-h from a set of base stations 105 serving the set of UEs 115. Network node 802 may transmit the set of multicast data to each of the set of base stations 105.

At 810, base station 105-h may transmit a multicast transmission to UE 115-1 and at 815, UE 115-1 may attempt to decode the multicast transmission. In some cases, UE 115-1 may determine that the multicast data may have been unsuccessfully decoded.

At 820, UE 115-1 may transmit a feedback message to the network node 802. The network node 802 may receive a feedback message including information associated with the multicast data that may have been unsuccessfully decoded. For example, the information may include an indication of one or more frames having the multicast data that have been unsuccessfully decoded by UE 115-1. In some cases, UE 115-1 may transmit the feedback message to the network node 802 by transmitting the feedback message to base station 105-h which may in turn propagate the feedback message to network node 802. In some cases, UE 115-1 may be handed over from base station 105-h to a second base station 105. Here, UE 115-1 may transmit the feedback message to network node 802 via the second base station 105.

At 825, the network node 802 may determine a set of multicast data that may have been unsuccessfully decoded by at least one UE (e.g., UE 115-1) based on the received feedback message. In some cases, network node 802 may receive feedback messages from more than one UE. Here, network node 802 may determine a set that may include a compilation of data that has been unsuccessfully decoded by each of the more than one UE 115. Network node 802 may identify respective feedback messages associated with multicast data transmitted by each base station 105 of a set of base stations 105. In some examples, the feedback messages may be received using a multicast ARQ protocol layer.

At 830, the network node 802 may transmit the set of multicast data that may have been unsuccessfully decoded to base station 105-h. Network node 802 may transmit the set of multicast data to a second base station 105 based on a handover (e.g., if UE 115-1 has been handed over from base station 105-h to the second base station 105). The network node 802 may transmit the set of multicast data via a broadcast transmission. At 835, base station 105-h may transmit multicast data to UE 115-1.

Figure 9:
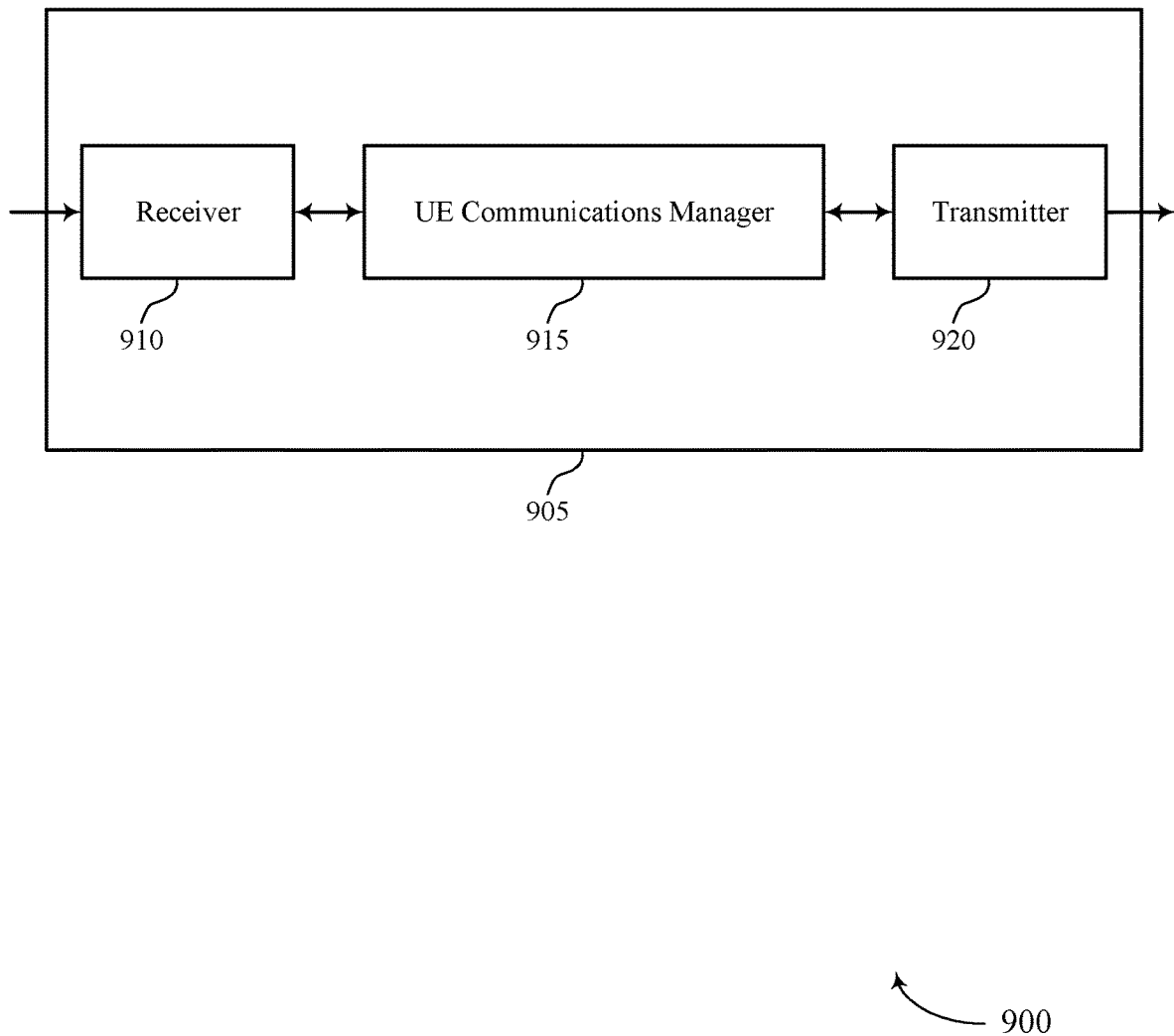
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reliability for multicast transmissions, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive a multicast transmission including a set of frames, attempt to decode multicast data within each frame of the set of frames, determine that multicast data within one or more respective frames from the set of frames has been unsuccessfully decoded, and transmit a feedback message based on the determination, the feedback message including information associated with the respective one or more frames having the unsuccessfully decoded multicast data. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a DSP, an application-specific integrated circuit (ASIC), a field-programmable gate array (FPGA), or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
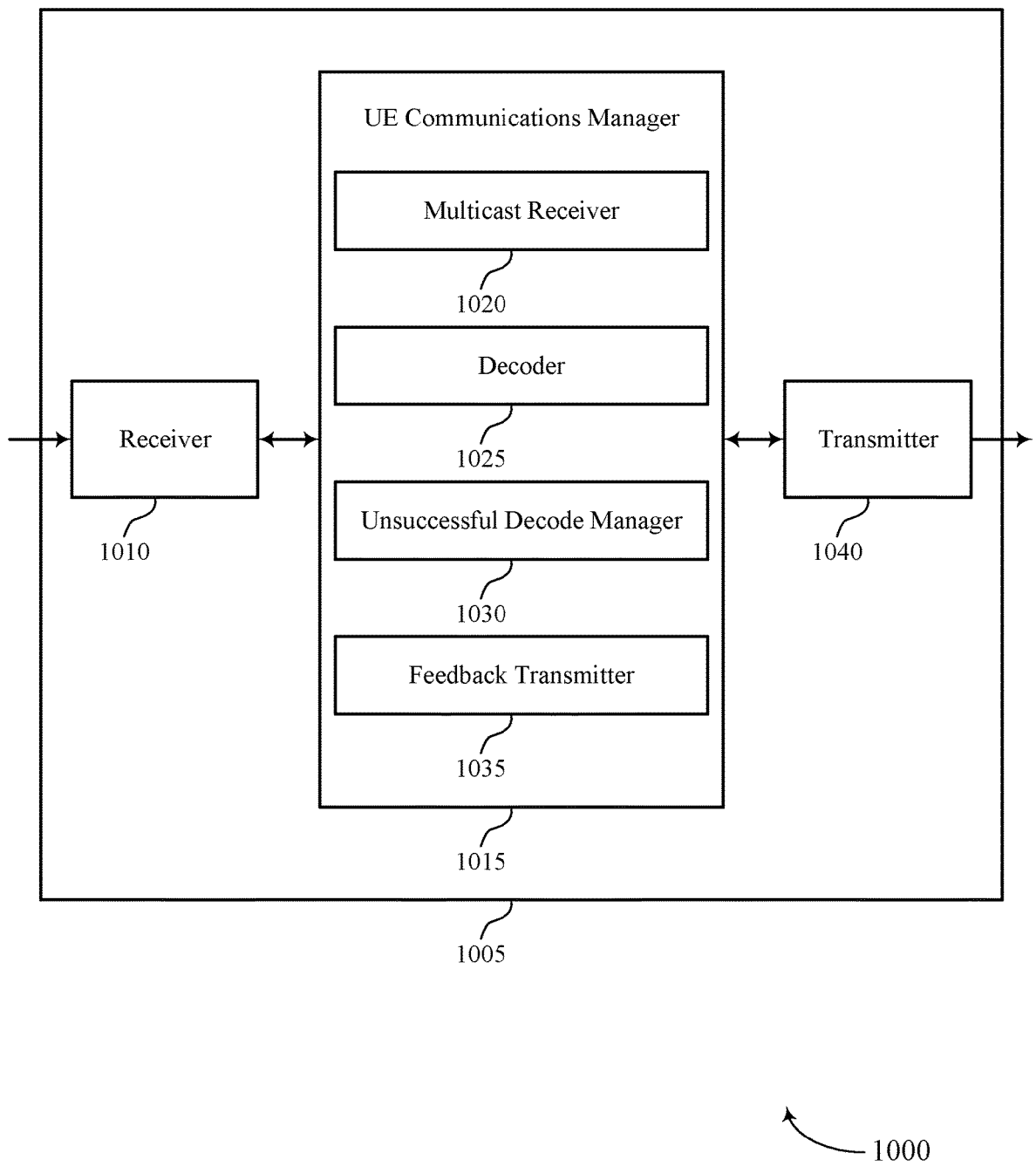

FIG. 10 shows a block diagram 1000 of a device 1005 in accordance with aspects of the present disclosure. The device 1005 may be an example of aspects of a device 905, or a UE 115 as described herein. The device 1005 may include a receiver 1010, a UE communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to reliability for multicast transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a multicast receiver 1020, a decoder 1025, an unsuccessful decode manager 1030, and a feedback transmitter 1035. The UE communications manager 1015 may be an example of aspects of the UE communications manager 1210 described herein.

The multicast receiver 1020 may receive a multicast transmission including a set of frames. The decoder 1025 may attempt to decode multicast data within each frame of the set of frames. The unsuccessful decode manager 1030 may determine that multicast data within one or more respective frames from the set of frames has been unsuccessfully decoded.

The feedback transmitter 1035 may transmit a feedback message based on the determination, the feedback message including information associated with the respective one or more frames having the unsuccessfully decoded multicast data.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
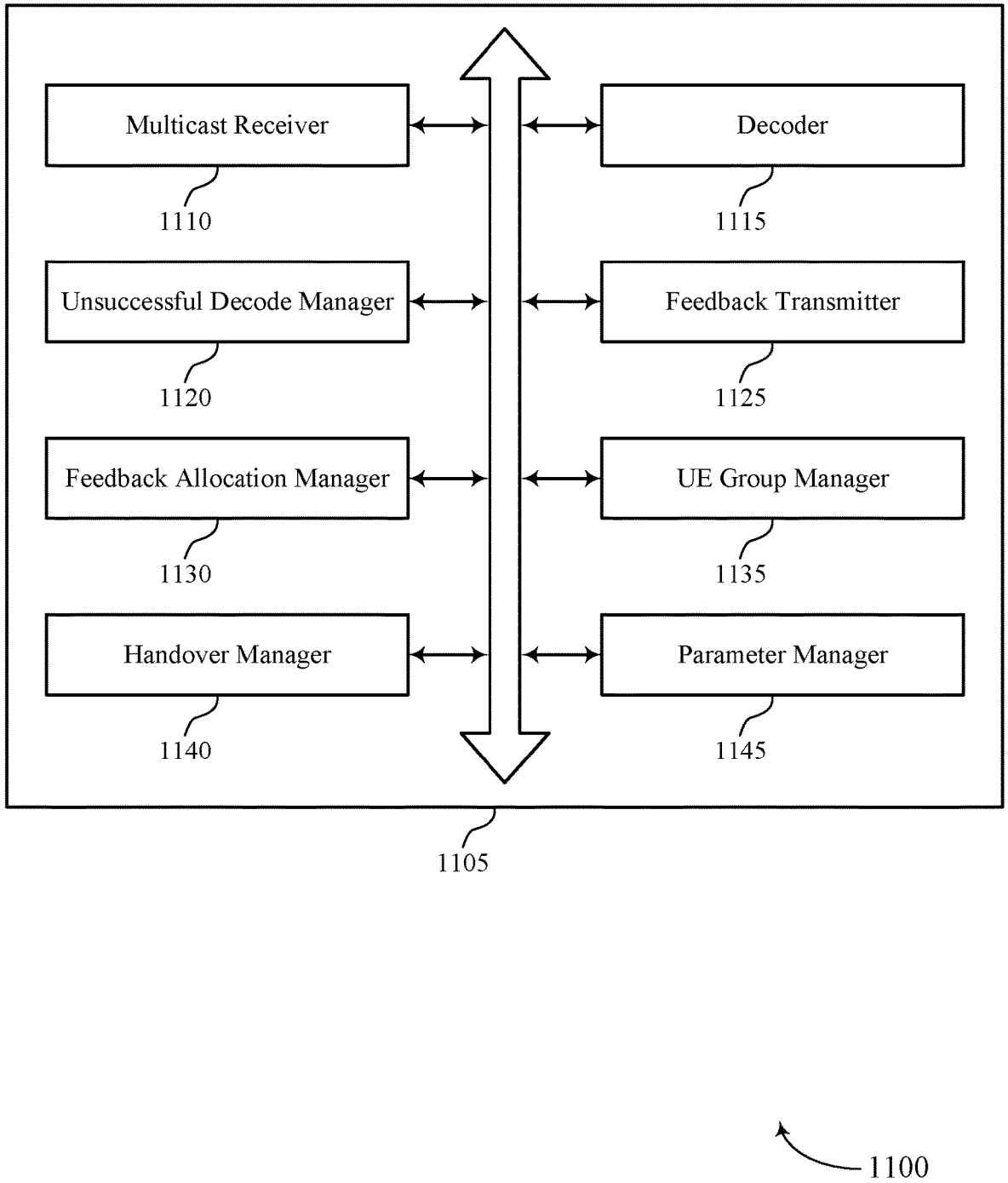
FIG. 11 shows a block diagram of a UE communications manager in accordance with aspects of the present disclosure.

FIG. 11 shows a block diagram 1100 of a UE communications manager 1105 in accordance with aspects of the present disclosure. The UE communications manager 1105 may be an example of aspects of a UE communications manager 915, a UE communications manager 1015, or a UE communications manager 1210 described herein. The UE communications manager 1105 may include a multicast receiver 1110, a decoder 1115, an unsuccessful decode manager 1120, a feedback transmitter 1125, a feedback allocation manager 1130, a UE group manager 1135, a handover manager 1140, and a parameter manager 1145. Each of these modules may communicate, directly or indirectly, with one another (e.g., via one or more buses).

The multicast receiver 1110 may receive a multicast transmission including a set of frames. In some examples, the multicast receiver 1110 may receive an additional transmission including at least the unsuccessfully decoded multicast data. In some examples, the multicast receiver 1110 may receive an additional transmission including at least the number of respective frames having the unsuccessfully decoded multicast data. In some examples, the multicast receiver 1110 may receive the multicast transmission from a first base station 105. In some examples, the multicast receiver 1110 may receive, from the second base station 105, at least the unsuccessfully decoded multicast data. In some cases, the multicast transmission is encoded using a raptor code.

The decoder 1115 may attempt to decode multicast data within each frame of the set of frames. In some cases, the scheduling allocation information is encoded using a first coding scheme that is different from a second coding scheme used for encoding a set of data on the downlink shared channel.

The unsuccessful decode manager 1120 may determine that multicast data within one or more respective frames from the set of frames has been unsuccessfully decoded. In some examples, the unsuccessful decode manager 1120 may determine that a threshold number of frames to decode the received multicast transmission have not been received, where the feedback message indicates a number of respective frames having the unsuccessfully decoded multicast data.

The feedback transmitter 1125 may transmit a feedback message based on the determination, the feedback message including information associated with the respective one or more frames having the unsuccessfully decoded multicast data. The information associated with the respective one or more frames may indicate the one or more respective frames having the unsuccessfully decoded multicast data. Additionally or alternatively, the information associated with the respective one or more frames may indicate an index of the respective one or more frames having the unsuccessfully decoded multicast data. In some examples, the feedback transmitter 1125 may transmit the feedback message via an uplink channel (e.g., an UL-SCH) in accordance with scheduling allocation information. In some examples, the feedback transmitter 1125 may transmit the feedback message via an uplink channel (e.g., an UL-SCH) on at least one periodic resource of the set of periodic resources. In some examples, the feedback transmitter 1125 may transmit the feedback message via an uplink control channel on the identified uplink resources. In some examples, the feedback transmitter 1125 may transmit the feedback message at a transmit time that is shifted according to a time offset value that is associated with the UE group. In some examples, the feedback transmitter 1125 may transmit the feedback message to a network node based on the determination, where the feedback message is transmitted using a multicast ARQ protocol layer, the method further including.

In some cases, the network node includes a user plane function. In some cases, the feedback message indicates an index of the respective one or more frames having the unsuccessfully decoded multicast data. In some cases, the feedback message includes a NACK.

The feedback allocation manager 1130 may receive DCI that indicates scheduling allocation information for the feedback message, where the scheduling allocation information is located within a downlink shared channel of the multicast transmission. In some examples, the feedback allocation manager 1130 may receive a resource grant for a set of periodic resources used for transmitting the feedback message for a frame of the set of frames within a TTI. In some examples, the feedback allocation manager 1130 may identify uplink resources for transmitting the feedback message based on the UE group. In some examples, the feedback allocation manager 1130 may transmit, to a base station 105, a request for uplink resources for transmitting the feedback message, where the request is based on receiving the multicast transmission.

The UE group manager 1135 may receive an indication of a UE group that the UE is assigned to. The handover manager 1140 may perform a handover to a second base station 105, where the feedback message is transmitted to the second base station 105 based on the handover. In some examples, the handover manager 1140 may perform a handover to a second base station 105, where the feedback message is transmitted to a network node based on the handover.

The parameter manager 1145 may receive an indication of a set of parameters including a latency requirement, an ARQ window length, a number of frames during which the feedback message is to be transmitted, a length of each frame of the set of frames, or a combination thereof.

Figure 12:
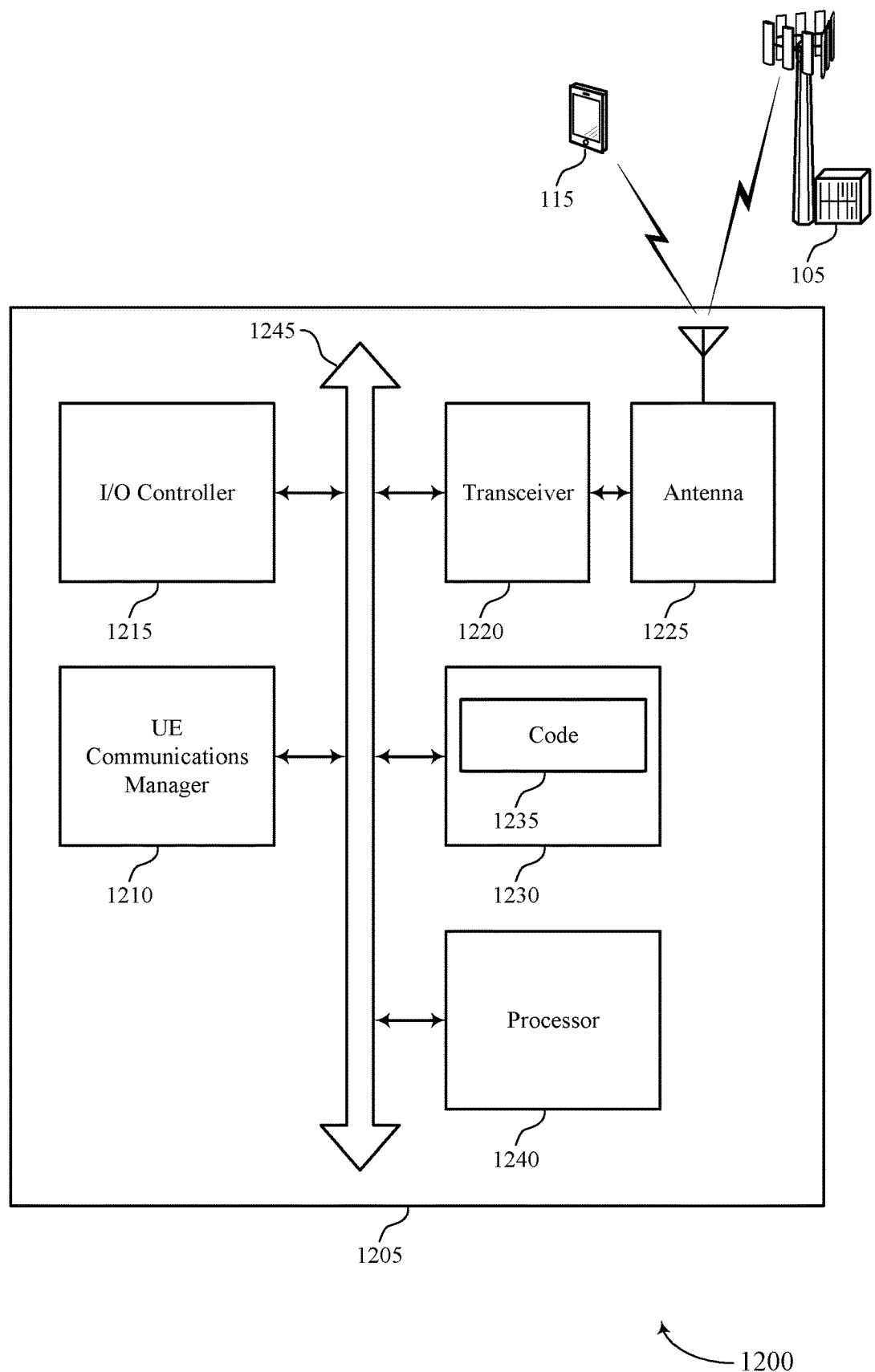
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may receive a multicast transmission including a set of frames, attempt to decode multicast data within each frame of the set of frames, determine that multicast data within one or more respective frames from the set of frames has been unsuccessfully decoded, and transmit a feedback message based on the determination, the feedback message including information associated with the respective one or more frames having the unsuccessfully decoded multicast data.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reliability for multicast transmissions).

Figure 13:
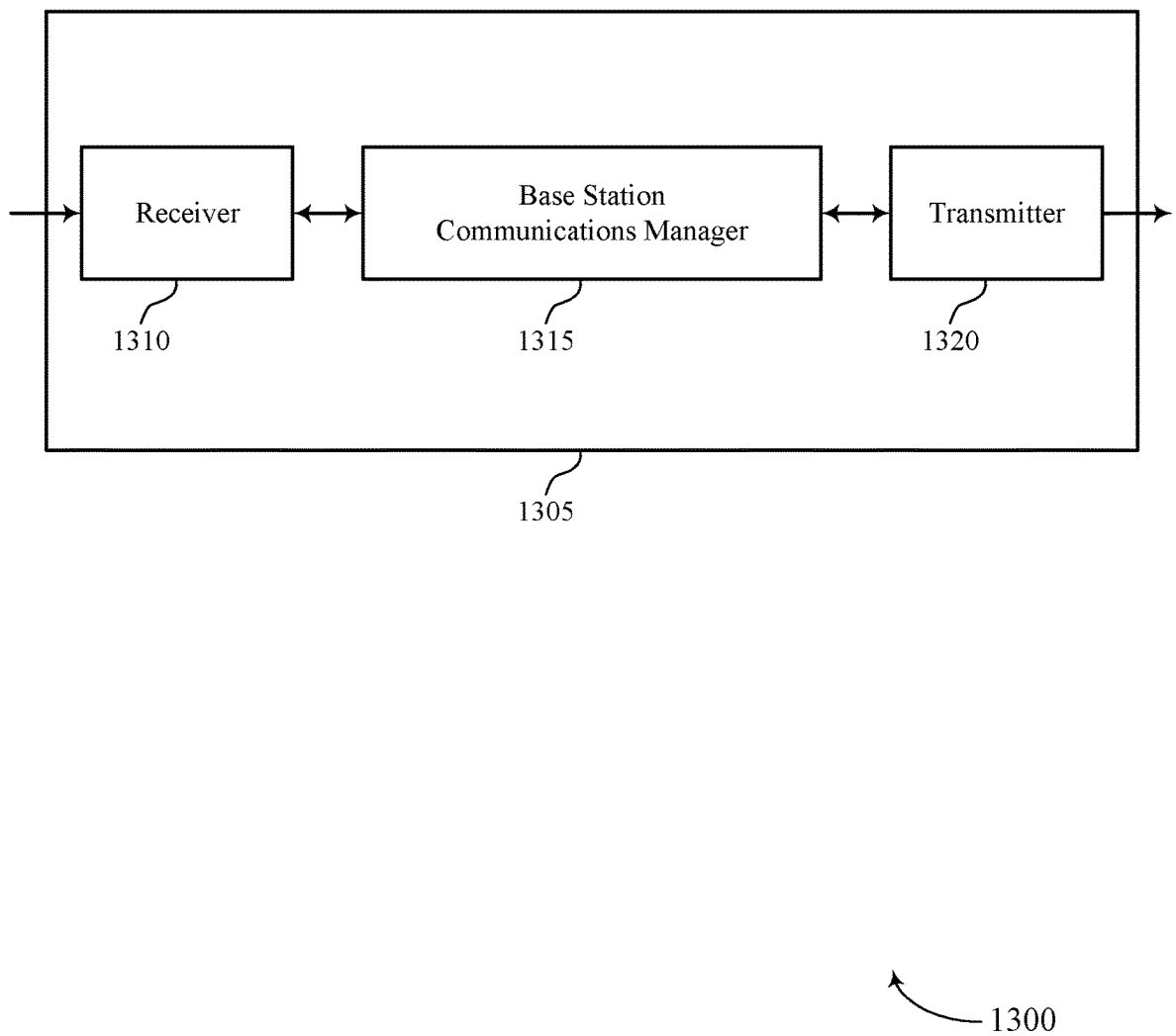
FIGS. 13 and 14 show block diagrams of devices in accordance with aspects of the present disclosure.

FIG. 13 shows a block diagram 1300 of a device 1305 in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to reliability for multicast transmissions, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit, to a set of UEs 115, a multicast transmission including a set of frames, transmit, to the set of UEs 115 and based on the respective feedback messages, an additional transmission including at least the stored multicast data that has been unsuccessfully decoded, store multicast data from a set of frames of the set of frames transmitted during a transmission window, and receive, from the set of UEs 115, respective feedback messages including information associated with one or more frames within the transmission window having multicast data unsuccessfully decoded by the one or more UEs 115. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
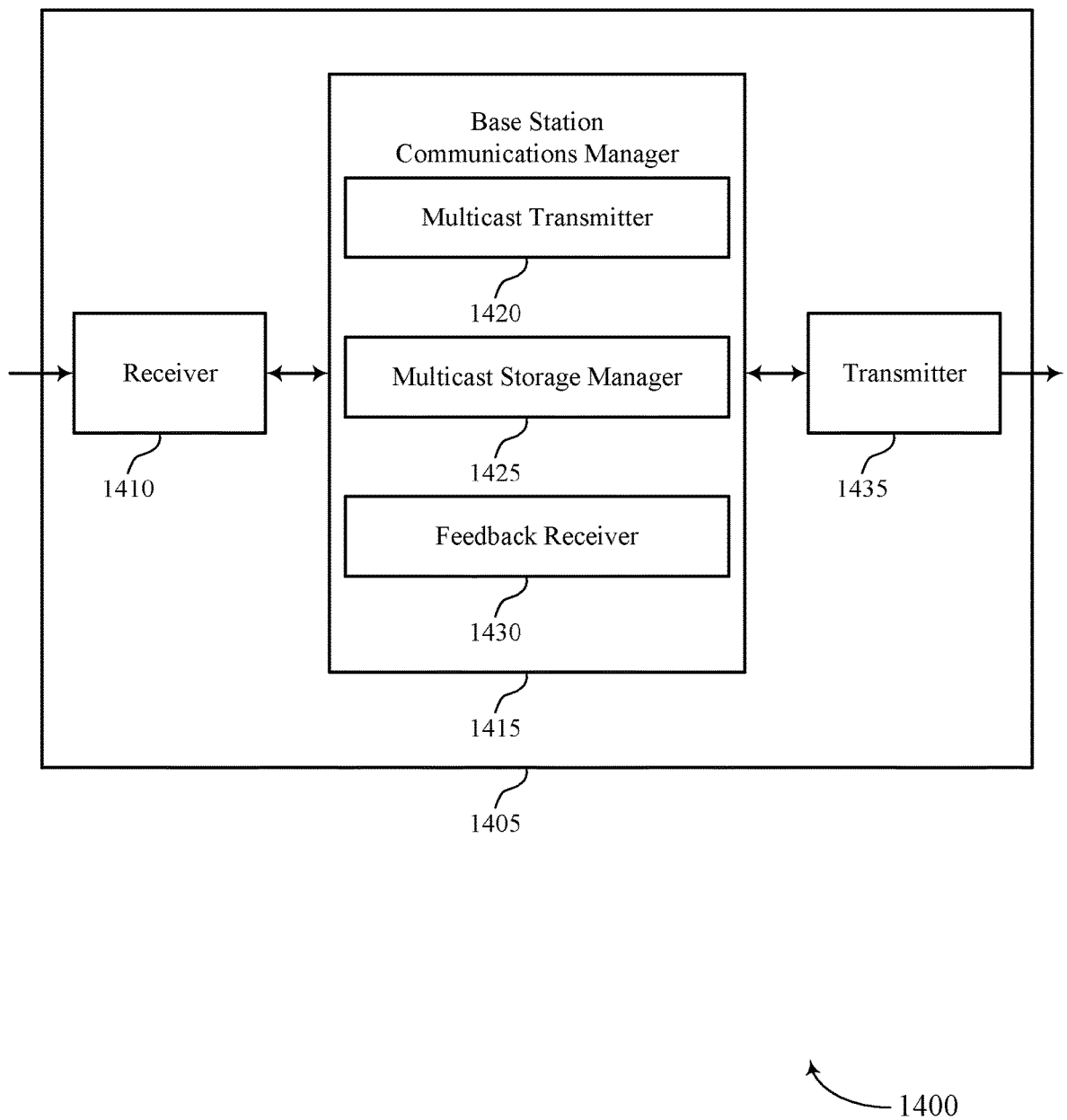

FIG. 14 shows a block diagram 1400 of a device 1405 in accordance with aspects of the present disclosure. The device 1405 may be an example of aspects of a device 1305, or a base station 105 as described herein. The device 1405 may include a receiver 1410, a base station communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to reliability for multicast transmissions, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a multicast transmitter 1420, a multicast storage manager 1425, and a feedback receiver 1430. The base station communications manager 1415 may be an example of aspects of the base station communications manager 1610 described herein.

The multicast transmitter 1420 may transmit, to a set of UEs 115, a multicast transmission including a set of frames and transmit, to the set of UEs 115 and based on the respective feedback messages, an additional transmission including at least the stored multicast data that has been unsuccessfully decoded.

The multicast storage manager 1425 may store multicast data from a set of frames of the set of frames transmitted during a transmission window.

The feedback receiver 1430 may receive, from the set of UEs 115, respective feedback messages including information associated with one or more frames within the transmission window having multicast data unsuccessfully decoded by the one or more UEs 115.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
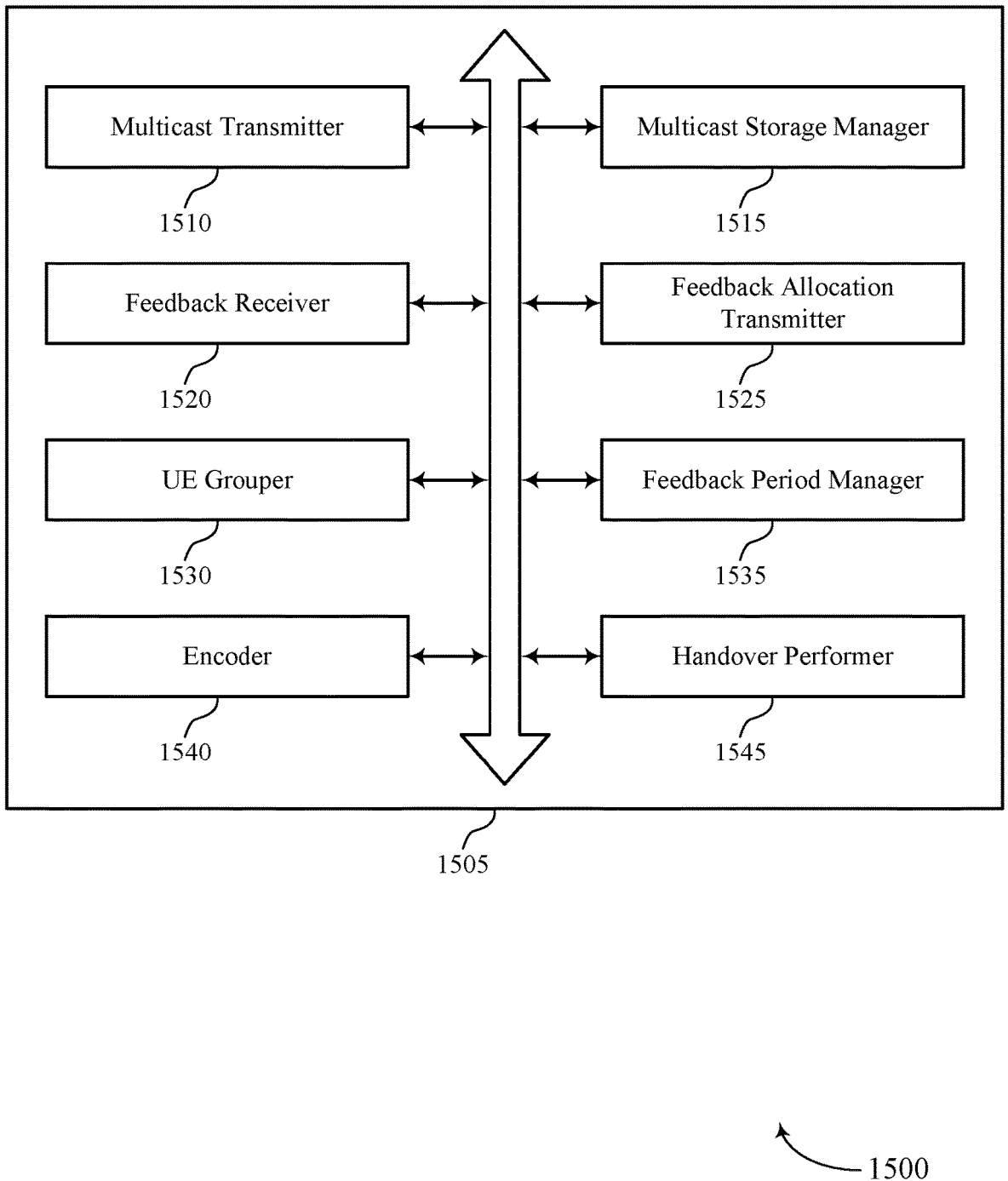
FIG. 15 shows a block diagram of a base station communications manager in accordance with aspects of the present disclosure.

FIG. 15 shows a block diagram 1500 of a base station communications manager 1505 in accordance with aspects of the present disclosure. The base station communications manager 1505 may be an example of aspects of a base station communications manager 1315, a base station communications manager 1415, or a base station communications manager 1610 described herein. The base station communications manager 1505 may include a multicast transmitter 1510, a multicast storage manager 1515, a feedback receiver 1520, a feedback allocation transmitter 1525, a UE grouper 1530, a feedback period manager 1535, an encoder 1540, and a handover performer 1545. Each of these modules may communicate, directly or indirectly, with one another (e.g., via one or more buses).

The multicast transmitter 1510 may transmit, to a set of UEs 115, a multicast transmission including a set of frames. In some examples, the multicast transmitter 1510 may transmit, to the set of UEs 115 and based on the respective feedback messages, an additional transmission including at least the stored multicast data that has been unsuccessfully decoded. In some examples, the multicast transmitter 1510 may transmit, within the additional transmission, the multicast data of the first frame and the second frame. In some examples, the multicast transmitter 1510 may transmit the additional transmission subsequent to the feedback period. In some examples, the multicast transmitter 1510 may transmit, to the second base station 105, the stored multicast data from the transmission window based on the handover.

The multicast storage manager 1515 may store multicast data from a set of frames of the set of frames transmitted during a transmission window. The feedback receiver 1520 may receive, from the set of UEs 115, respective feedback messages including information associated with one or more frames within the transmission window having multicast data unsuccessfully decoded by the one or more UEs 115. In some examples, the feedback receiver 1520 may determine that the respective feedback messages from the one or more UEs 115 are to be received during two or more frames.

In some examples, the feedback receiver 1520 may receive a first set of feedback messages associated with a first UE group at a first transmit time. In some examples, the feedback receiver 1520 may receive a second set of feedback messages from a second UE group at a second transmit time that is shifted from the first transmit time. In some examples, the feedback receiver 1520 may receive a first feedback message from a first UE indicating a first frame having multicast data that has been unsuccessfully decoded. In some examples, the feedback receiver 1520 may receive a second feedback message from a second UE indicating a second frame having multicast data that has been unsuccessfully decoded.

The feedback allocation transmitter 1525 may transmit, to a UE of the set of UEs 115, DCI that indicates scheduling allocation information for uplink resources allocated for a feedback message, the scheduling allocation information being located within a downlink shared channel of the multicast transmission, and where the uplink resources include an uplink channel (e.g., an UL-SCH, dedicated uplink resources). In some cases, the scheduling allocation information is encoded using a first coding scheme that is different from a second coding scheme used for encoding a set of data on the downlink shared channel.

In some examples, the feedback allocation transmitter 1525 may transmit, to a UE of the set of UEs 115, a resource grant for a set of periodic resources allocated for transmitting a feedback message for one or more frames within the transmission window, where the set of periodic resources include one or more uplink channels (e.g., UL-SCHs). In some examples, the feedback allocation transmitter 1525 may transmit, to the set of UEs 115, an indication of the set of UE groups and the time offset values associated with each UE group.

The UE grouper 1530 may group the set of UEs 115 into a set of UE groups based on the determination. In some examples, the UE grouper 1530 may configure time offset values associated with each UE group of the set of UE groups, where time offset values are indicative of different uplink resources allocated for receiving the respective feedback messages. The feedback period manager 1535 may determine a feedback period for receiving feedback from the set of UEs 115.

The encoder 1540 may encode the multicast transmission using a raptor code, where the respective feedback messages include an indication of a number of respective frames having multicast data that has been unsuccessfully decoded, and where the additional transmission includes at least the number of respective frames having multicast data that has been unsuccessfully decoded. The handover performer 1545 may perform a handover of a first UE from the set of UEs 115 to a second base station 105. In some cases, the handover performer 1545 may receive, from a network node (e.g., a UPF), an indication of a mapping of sequence numbers to frames. In such cases, the handover performer 1545 may assign a respective sequence number to each of the one or more frames based on the mapping.

Figure 16:
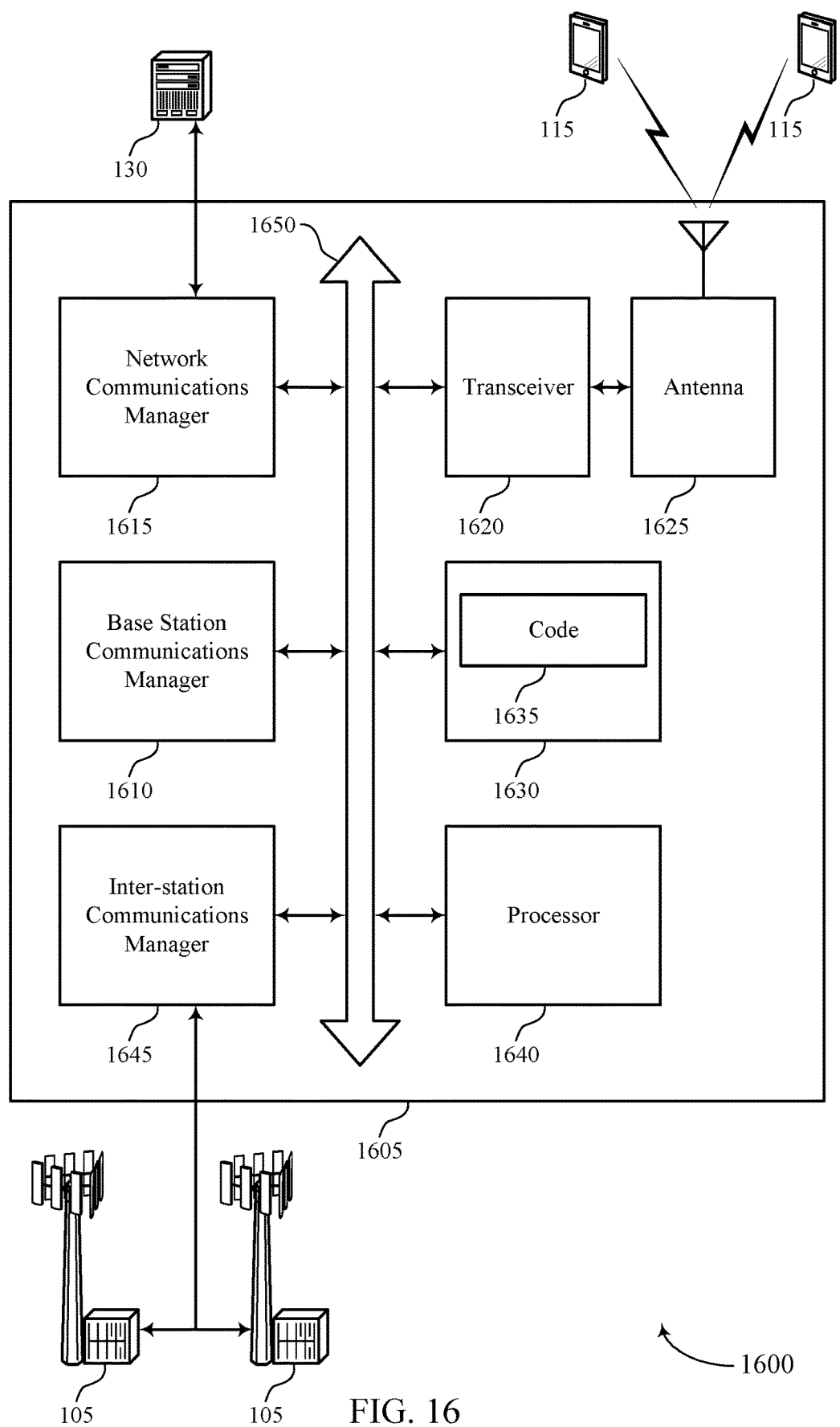
FIG. 16 shows a diagram of a system including a device in accordance with aspects of the present disclosure.

FIG. 16 shows a diagram of a system 1600 including a device 1605 in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may transmit, to a set of UEs 115, a multicast transmission including a set of frames, transmit, to the set of UEs 115 and based on the respective feedback messages, an additional transmission including at least the stored multicast data that has been unsuccessfully decoded, store multicast data from a set of frames of the set of frames transmitted during a transmission window, and receive, from the set of UEs 115, respective feedback messages including information associated with one or more frames within the transmission window having multicast data unsuccessfully decoded by the one or more UEs 115.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting reliability for multicast transmissions).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
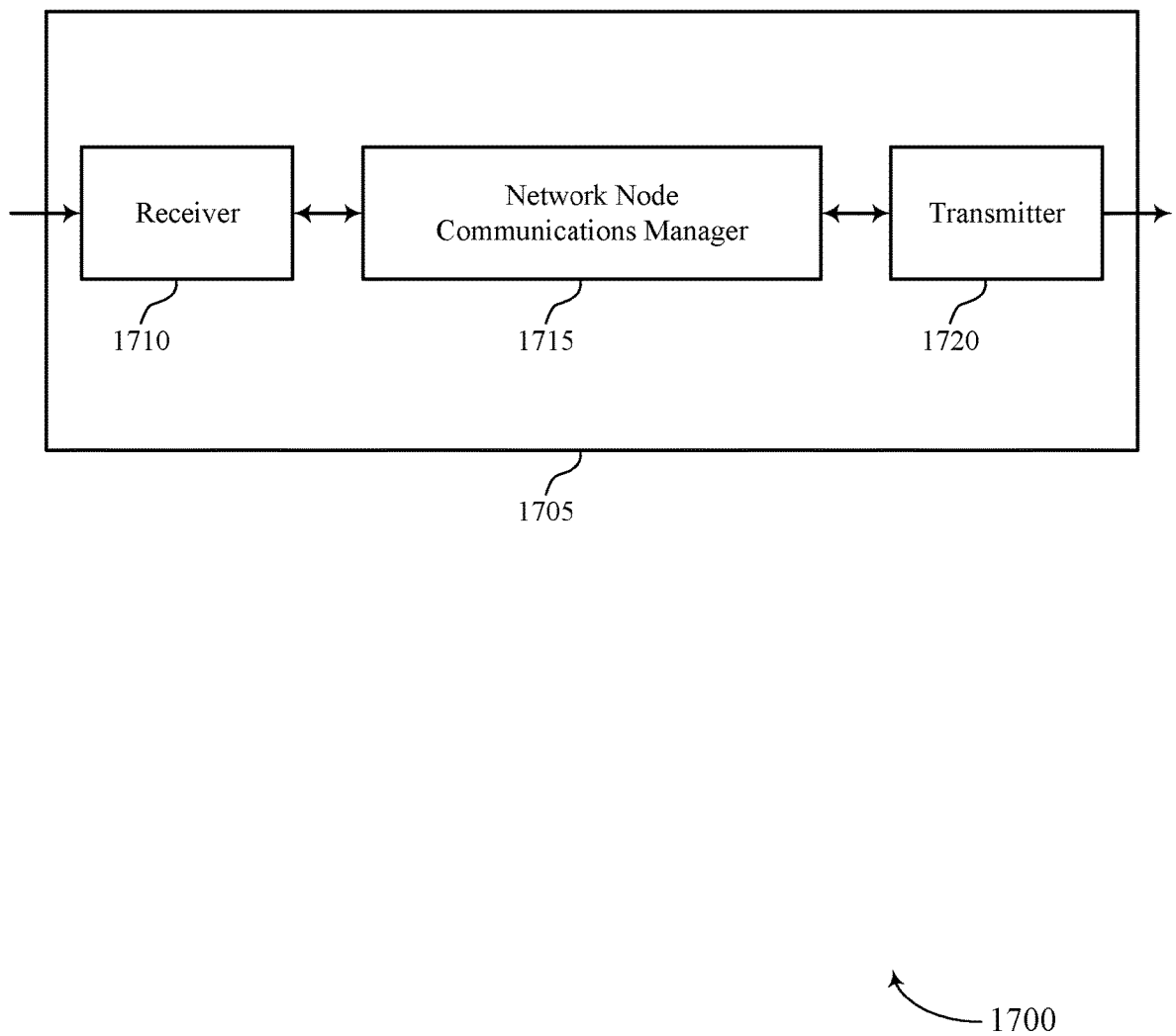
FIGS. 17 and 18 show block diagrams of devices in accordance with aspects of the present disclosure.

FIG. 17 shows a block diagram 1700 of a device 1705 in accordance with aspects of the present disclosure. The device 1705 may be an example of aspects of a network node as described herein. The device 1705 may include a receiver 1710, a network node communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to reliability for multicast transmissions, etc.). Information may be passed on to other components of the device 1705. The receiver 1710 may be an example of aspects of the transceiver 2020 described with reference to FIG. 20. The receiver 1710 may utilize a single antenna or a set of antennas.

The network node communications manager 1715 may transmit, to a set of base stations 105, multicast data to be transmitted to a set of UEs 115, transmit, to at least one base station 105 of the set of base stations 105, the set of multicast data via an additional broadcast transmission, receive, from respective UEs 115 of the set of UEs 115, feedback messages that each include an indication of one or more frames having the multicast data that has been unsuccessfully decoded by the respective UE, and determine a set of multicast data that has been unsuccessfully decoded by at least one UE based on the received feedback messages. The network node communications manager 1715 may be an example of aspects of the network node communications manager 2010 described herein.

The network node communications manager 1715, or its sub-components, may be implemented in hardware, code (e.g., software or firmware) executed by a processor, or any combination thereof. If implemented in code executed by a processor, the functions of the network node communications manager 1715, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The network node communications manager 1715, or its sub-components, may be physically located at various positions, including being distributed such that portions of functions are implemented at different physical locations by one or more physical components. In some examples, the network node communications manager 1715, or its sub-components, may be a separate and distinct component in accordance with various aspects of the present disclosure. In some examples, the network node communications manager 1715, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
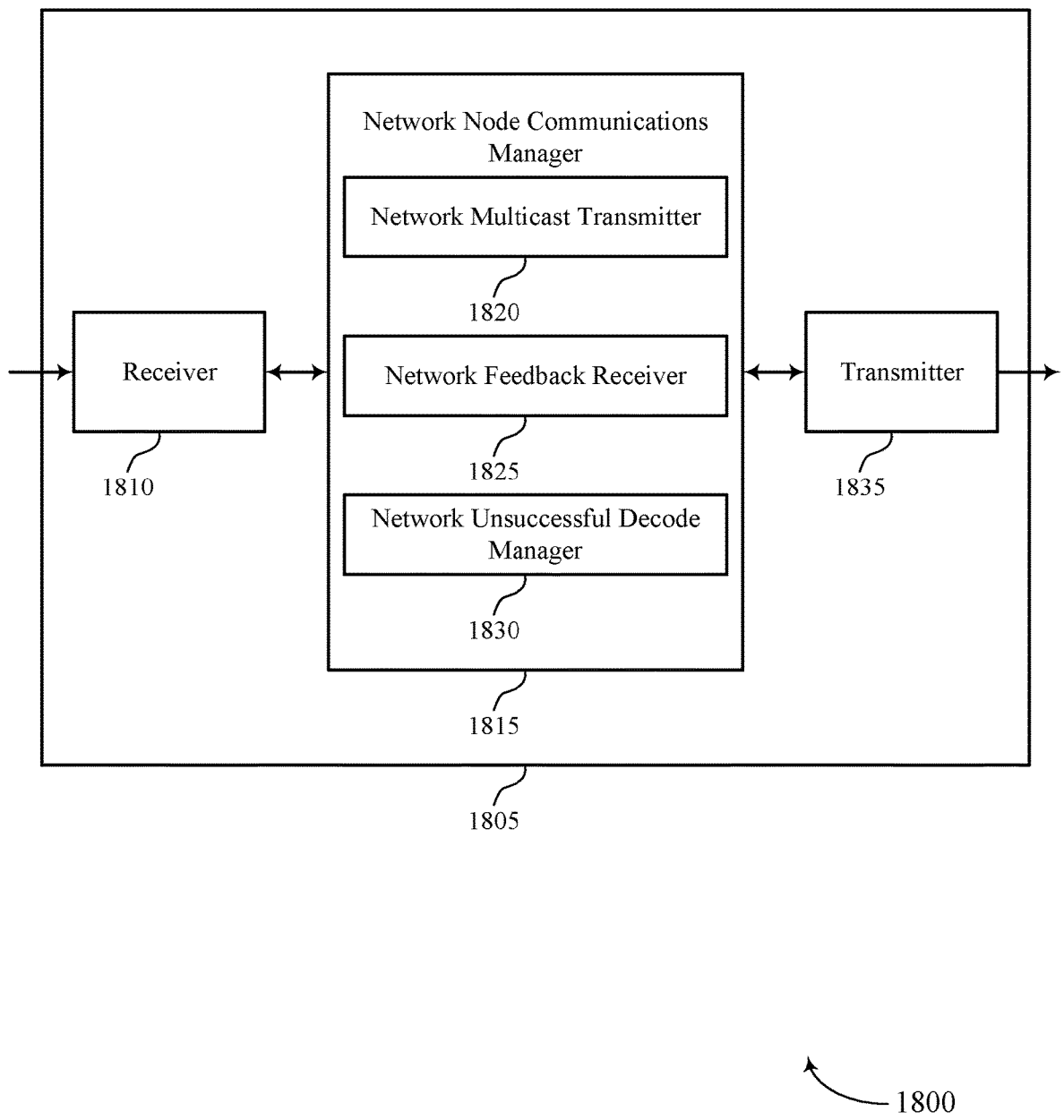

FIG. 18 shows a block diagram 1800 of a device 1805 in accordance with aspects of the present disclosure. The device 1805 may be an example of aspects of a device 1705 or a network node as described herein. The device 1805 may include a receiver 1810, a network node communications manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to reliability for multicast transmissions, etc.). Information may be passed on to other components of the device 1805. The receiver 1810 may be an example of aspects of the transceiver 2020 described with reference to FIG. 20. The receiver 1810 may utilize a single antenna or a set of antennas.

The network node communications manager 1815 may be an example of aspects of the network node communications manager 1715 as described herein. The Network node communications manager 1815 may include a network multicast transmitter 1820, a network feedback receiver 1825, and a network unsuccessful decode manager 1830. The network node communications manager 1815 may be an example of aspects of the network node communications manager 2010 described herein.

The network multicast transmitter 1820 may transmit, to a set of base stations 105, multicast data to be transmitted to a set of UEs 115 and transmit, to at least one base station 105 of the set of base stations 105, the set of multicast data via an additional broadcast transmission.

The network feedback receiver 1825 may receive, from respective UEs of the set of UEs, feedback messages that each include an indication of one or more frames having the multicast data that has been unsuccessfully decoded by the respective UE. The network unsuccessful decode manager 1830 may determine a set of multicast data that has been unsuccessfully decoded by at least one UE based on the received feedback messages.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
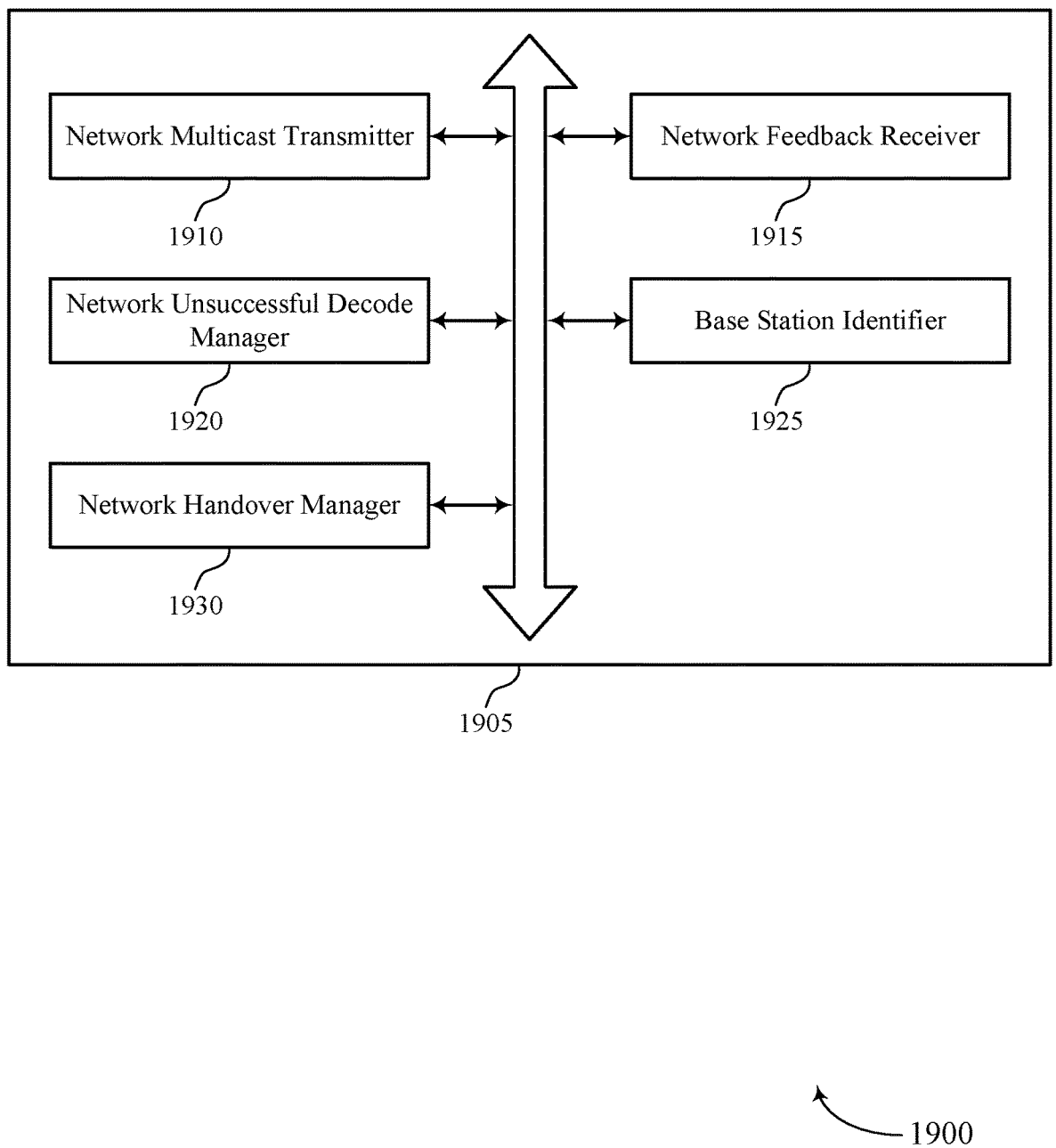
FIG. 19 shows a block diagram of a network node communications manager in accordance with aspects of the present disclosure.

FIG. 19 shows a block diagram 1900 of a network node communications manager 1905 in accordance with aspects of the present disclosure. The network node communications manager 1905 may be an example of aspects of a network node communications manager 1715, a network node communications manager 1815, or a network node communications manager 2010 described herein. The network node communications manager 1905 may include a network multicast transmitter 1910, a network feedback receiver 1915, a network unsuccessful decode manager 1920, a base station identifier 1925, and a network handover manager 1930. Each of these modules may communicate, directly or indirectly, with one another (e.g., via one or more buses).

The network multicast transmitter 1910 may transmit, to a set of base stations 105, multicast data to be transmitted to a set of UEs 115. In some examples, the network multicast transmitter 1910 may transmit, to at least one base station 105 of the set of base stations 105, the set of multicast data via an additional broadcast transmission. In some examples, the network multicast transmitter 1910 may transmit the multicast data to the second base station 105 based on the determination that the first UE 115 has been handed over. In some cases, the set of multicast data is transmitted to each of the set of base stations 105.

The network feedback receiver 1915 may receive, from respective UEs 115 of the set of UEs 115, feedback messages that each include an indication of one or more frames having the multicast data that has been unsuccessfully decoded by the respective UE. In some cases, the feedback messages are received using a multicast ARQ protocol layer. In some examples, the network feedback receiver 1915 may identify respective feedback messages associated with multicast data transmitted by each base station 105 of the set of base stations 105. In some examples, the network feedback receiver 1915 may receive a feedback message from the first UE indicating that one or more frames having the multicast data has been unsuccessfully decoded by the first UE.

The network unsuccessful decode manager 1920 may determine a set of multicast data that has been unsuccessfully decoded by at least one UE based on the received feedback messages. The base station identifier 1925 may identify a first base station 105 from the set of base stations 105 serving at least one of the respective UEs 115, where the set of multicast data is transmitted to the identified first base station 105. The network handover manager 1930 may determine that a first UE from the set of UEs 115 has been handed over from a first base station 105 to a second base station 105.

Figure 20:
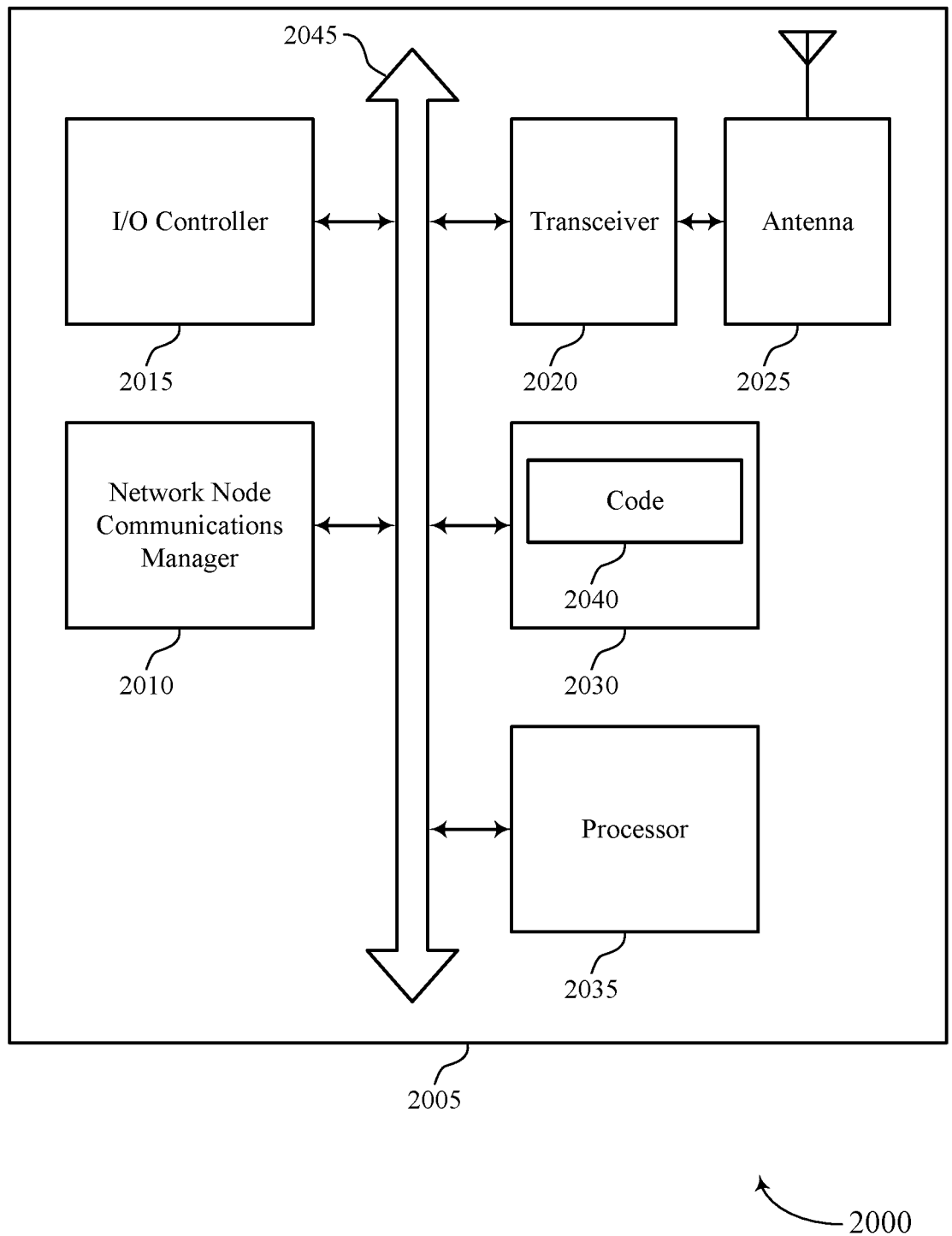
FIG. 20 shows a diagram of a system including a device in accordance with aspects of the present disclosure.

FIG. 20 shows a diagram of a system 2000 including a device 2005 in accordance with aspects of the present disclosure. The device 2005 may be an example of or include the components of device 1705, device 1805, or a network node as described herein. The device 2005 may include components for bi-directional voice and data communications including components for transmitting and receiving communications, including a network node communications manager 2010, an I/O controller 2015, a transceiver 2020, an antenna 2025, memory 2030, and a processor 2035. These components may be in electronic communication via one or more buses (e.g., bus 2045).

The network node communications manager 2010 may transmit, to a set of base stations 105, multicast data to be transmitted to a set of UEs 115, transmit, to at least one base station 105 of the set of base stations 105, the set of multicast data via an additional broadcast transmission, receive, from respective UEs 115 of the set of UEs 115, feedback messages that each include an indication of one or more frames having the multicast data that has been unsuccessfully decoded by the respective UE, and determine a set of multicast data that has been unsuccessfully decoded by at least one UE based on the received feedback messages.

The I/O controller 2015 may manage input and output signals for the device 2005. The I/O controller 2015 may also manage peripherals not integrated into the device 2005. In some cases, the I/O controller 2015 may represent a physical connection or port to an external peripheral. In some cases, the I/O controller 2015 may utilize an operating system such as iOS®, ANDROID®, MS-DOS®, MS-WINDOWS®, OS/2®, UNIX®, LINUX®, or another known operating system. In other cases, the I/O controller 2015 may represent or interact with a modem, a keyboard, a mouse, a touchscreen, or a similar device. In some cases, the I/O controller 2015 may be implemented as part of a processor. In some cases, a user may interact with the device 2005 via the I/O controller 2015 or via hardware components controlled by the I/O controller 2015.

The transceiver 2020 may communicate bi-directionally, via one or more antennas, wired, or wireless links as described herein. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM and ROM. The memory 2030 may store computer-readable, computer-executable code 2040 including instructions that, when executed, cause the processor to perform various functions described herein. In some cases, the memory 2030 may contain, among other things, a BIOS which may control basic hardware or software operation such as the interaction with peripheral components or devices.

The processor 2035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2035 may be configured to operate a memory array using a memory controller. In other cases, a memory controller may be integrated into the processor 2035. The processor 2035 may be configured to execute computer-readable instructions stored in a memory (e.g., the memory 2030) to cause the device 2005 to perform various functions (e.g., functions or tasks supporting reliability for multicast transmissions).

The code 2040 may include instructions to implement aspects of the present disclosure, including instructions to support wireless communications. The code 2040 may be stored in a non-transitory computer-readable medium such as system memory or other type of memory. In some cases, the code 2040 may not be directly executable by the processor 2035 but may cause a computer (e.g., when compiled and executed) to perform functions described herein.

Figure 21:
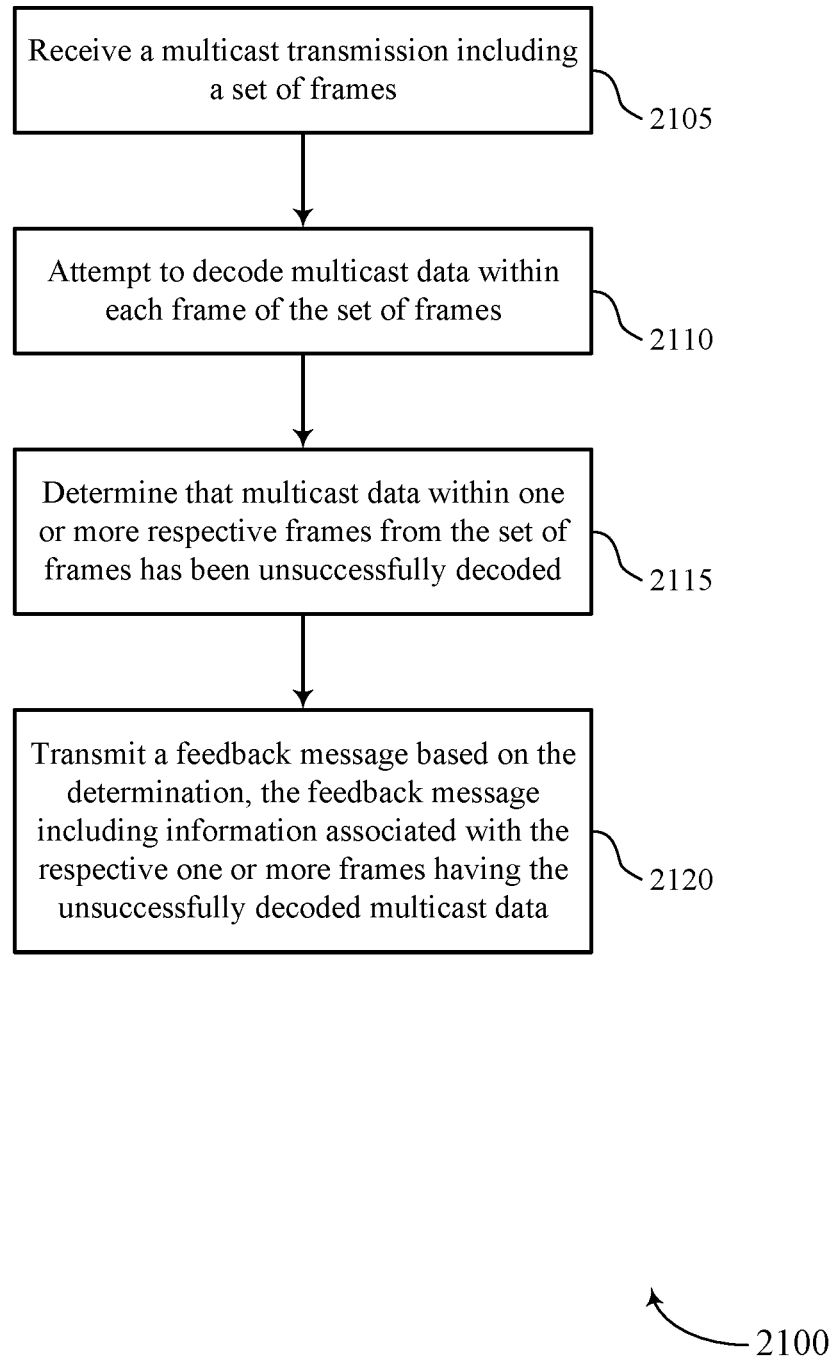
FIGS. 21 through 27 show flowcharts illustrating methods in accordance with aspects of the present disclosure.

FIG. 21 shows a flowchart illustrating a method 2100 in accordance with aspects of the present disclosure. The operations of method 2100 may be implemented by a UE 115 or its components as described herein. For example, the operations of method 2100 may be performed by a UE communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2105, the UE may receive a multicast transmission including a set of frames. The operations of 2105 may be performed according to the methods described herein. In some examples, aspects of the operations of 2105 may be performed by a multicast receiver as described with reference to FIGS. 9 through 12.

At 2110, the UE may attempt to decode multicast data within each frame of the set of frames. The operations of 2110 may be performed according to the methods described herein. In some examples, aspects of the operations of 2110 may be performed by a decoder as described with reference to FIGS. 9 through 12.

At 2115, the UE may determine that multicast data within one or more respective frames from the set of frames has been unsuccessfully decoded. The operations of 2115 may be performed according to the methods described herein. In some examples, aspects of the operations of 2115 may be performed by an unsuccessful decode manager as described with reference to FIGS. 9 through 12.

At 2120, the UE may transmit a feedback message based on the determination, the feedback message including information associated with the respective one or more frames having the unsuccessfully decoded multicast data. The operations of 2120 may be performed according to the methods described herein. In some examples, aspects of the operations of 2120 may be performed by a feedback transmitter as described with reference to FIGS. 9 through 12.

Figure 22:
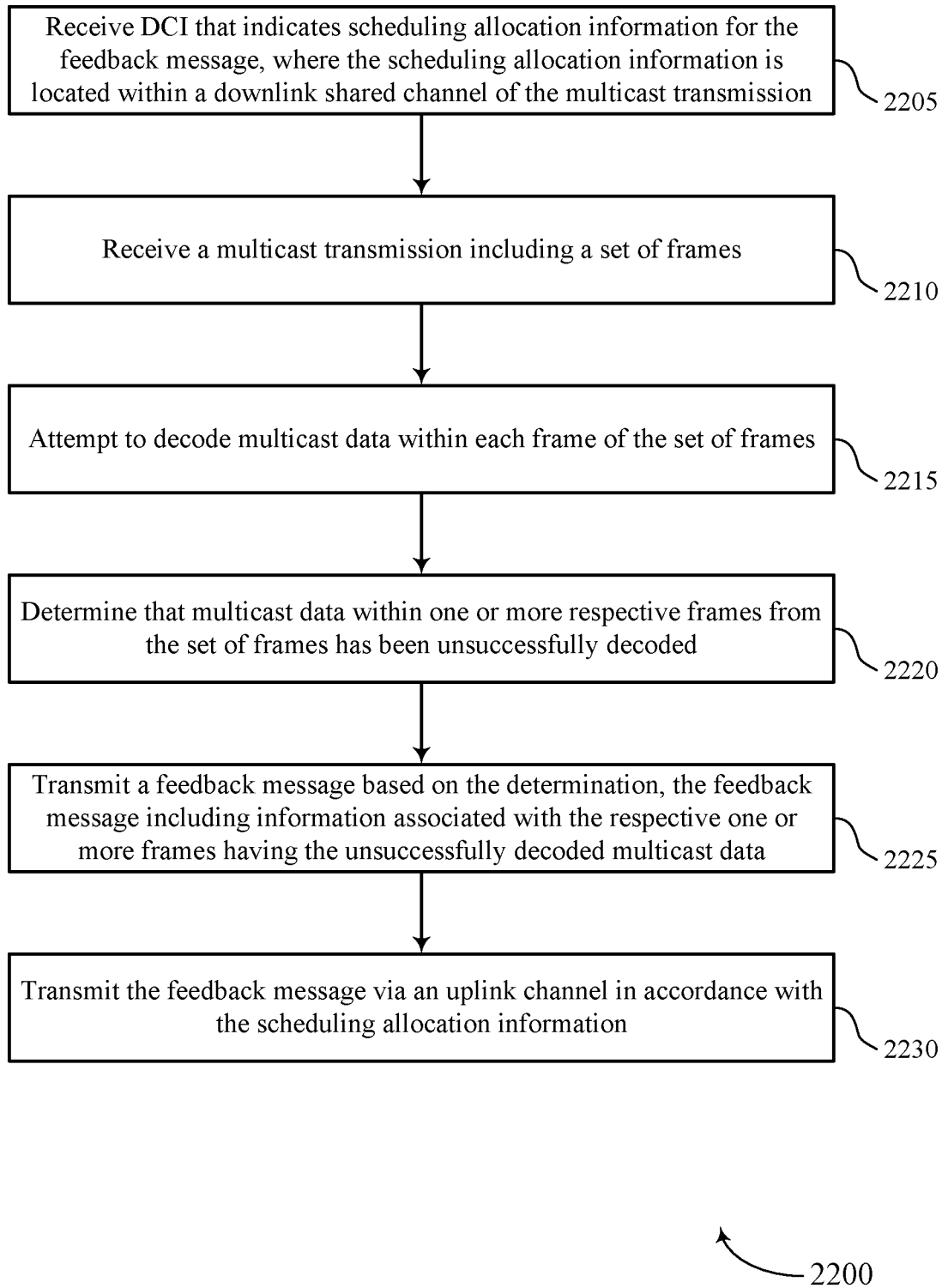

FIG. 22 shows a flowchart illustrating a method 2200 in accordance with aspects of the present disclosure. The operations of method 2200 may be implemented by a UE 115 or its components as described herein. For example, the operations of method 2200 may be performed by a UE communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2205, the UE may receive DCI that indicates scheduling allocation information for the feedback message, where the scheduling allocation information is located within a downlink shared channel of the multicast transmission. The operations of 2205 may be performed according to the methods described herein. In some examples, aspects of the operations of 2205 may be performed by a feedback allocation manager as described with reference to FIGS. 9 through 12.

At 2210, the UE may receive a multicast transmission including a set of frames. The operations of 2210 may be performed according to the methods described herein. In some examples, aspects of the operations of 2210 may be performed by a multicast receiver as described with reference to FIGS. 9 through 12.

At 2215, the UE may attempt to decode multicast data within each frame of the set of frames. The operations of 2215 may be performed according to the methods described herein. In some examples, aspects of the operations of 2215 may be performed by a decoder as described with reference to FIGS. 9 through 12.

At 2220, the UE may determine that multicast data within one or more respective frames from the set of frames has been unsuccessfully decoded. The operations of 2220 may be performed according to the methods described herein. In some examples, aspects of the operations of 2220 may be performed by an unsuccessful decode manager as described with reference to FIGS. 9 through 12.

At 2225, the UE may transmit a feedback message based on the determination, the feedback message including information associated with the respective one or more frames having the unsuccessfully decoded multicast data. The operations of 2225 may be performed according to the methods described herein. In some examples, aspects of the operations of 2225 may be performed by a feedback transmitter as described with reference to FIGS. 9 through 12.

At 2230, the UE may transmit the feedback message via an uplink channel (e.g., UL-SCH) in accordance with the scheduling allocation information. The operations of 2230 may be performed according to the methods described herein. In some examples, aspects of the operations of 2230 may be performed by a feedback transmitter as described with reference to FIGS. 9 through 12.

Figure 23:
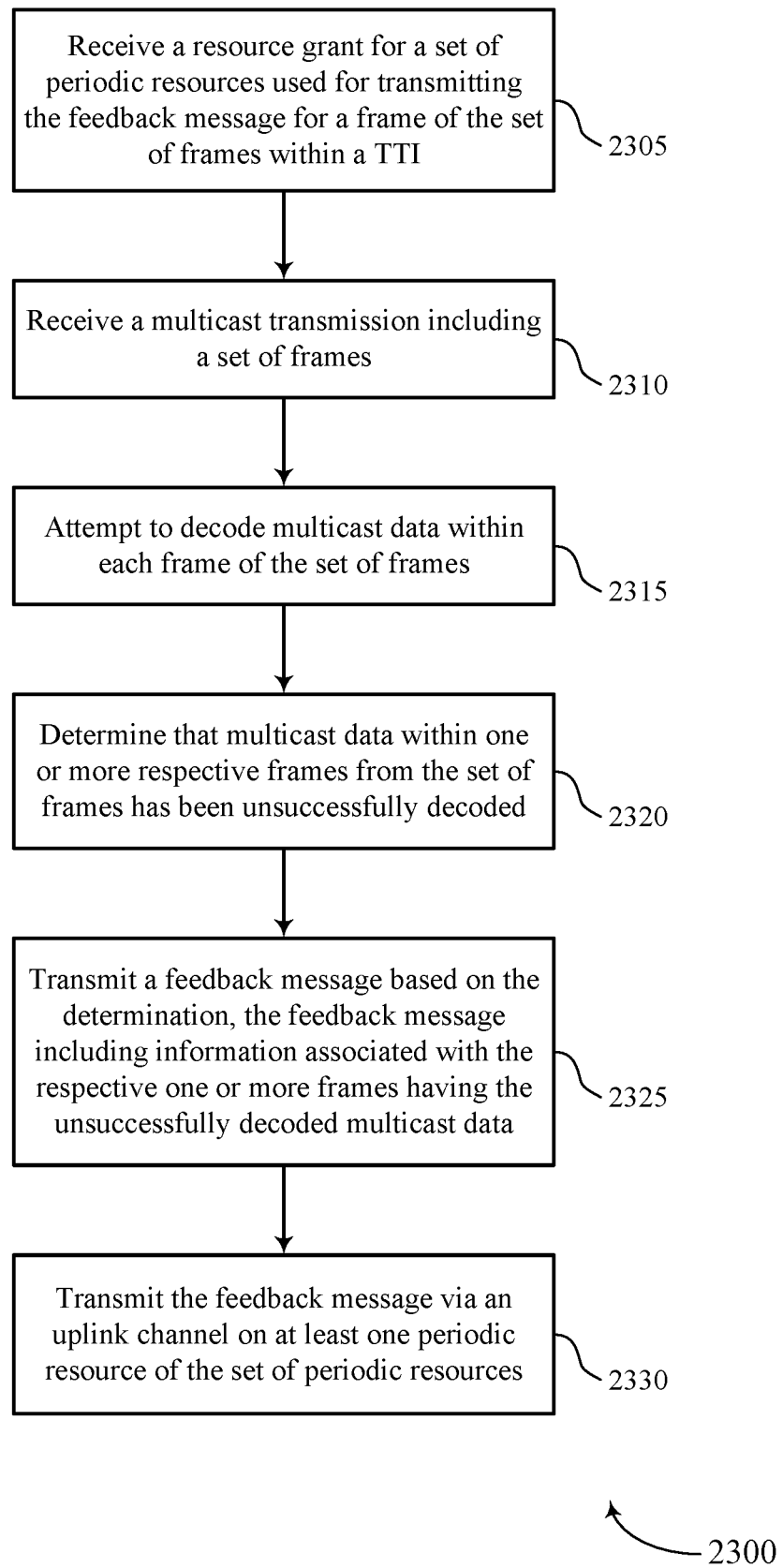

FIG. 23 shows a flowchart illustrating a method 2300 in accordance with aspects of the present disclosure. The operations of method 2300 may be implemented by a UE 115 or its components as described herein. For example, the operations of method 2300 may be performed by a UE communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2305, the UE may receive a resource grant for a set of periodic resources used for transmitting the feedback message for a frame of the set of frames within a TTI. The operations of 2305 may be performed according to the methods described herein. In some examples, aspects of the operations of 2305 may be performed by a feedback allocation manager as described with reference to FIGS. 9 through 12.

At 2310, the UE may receive a multicast transmission including a set of frames. The operations of 2310 may be performed according to the methods described herein. In some examples, aspects of the operations of 2310 may be performed by a multicast receiver as described with reference to FIGS. 9 through 12.

At 2315, the UE may attempt to decode multicast data within each frame of the set of frames. The operations of 2315 may be performed according to the methods described herein. In some examples, aspects of the operations of 2315 may be performed by a decoder as described with reference to FIGS. 9 through 12.

At 2320, the UE may determine that multicast data within one or more respective frames from the set of frames has been unsuccessfully decoded. The operations of 2320 may be performed according to the methods described herein. In some examples, aspects of the operations of 2320 may be performed by an unsuccessful decode manager as described with reference to FIGS. 9 through 12.

At 2325, the UE may transmit a feedback message based on the determination, the feedback message including information associated with the respective one or more frames having the unsuccessfully decoded multicast data. The operations of 2325 may be performed according to the methods described herein. In some examples, aspects of the operations of 2325 may be performed by a feedback transmitter as described with reference to FIGS. 9 through 12.

At 2330, the UE may transmit the feedback message via an uplink channel (e.g., an UL-SCH) on at least one periodic resource of the set of periodic resources. The operations of 2330 may be performed according to the methods described herein. In some examples, aspects of the operations of 2330 may be performed by a feedback transmitter as described with reference to FIGS. 9 through 12.

Figure 24:
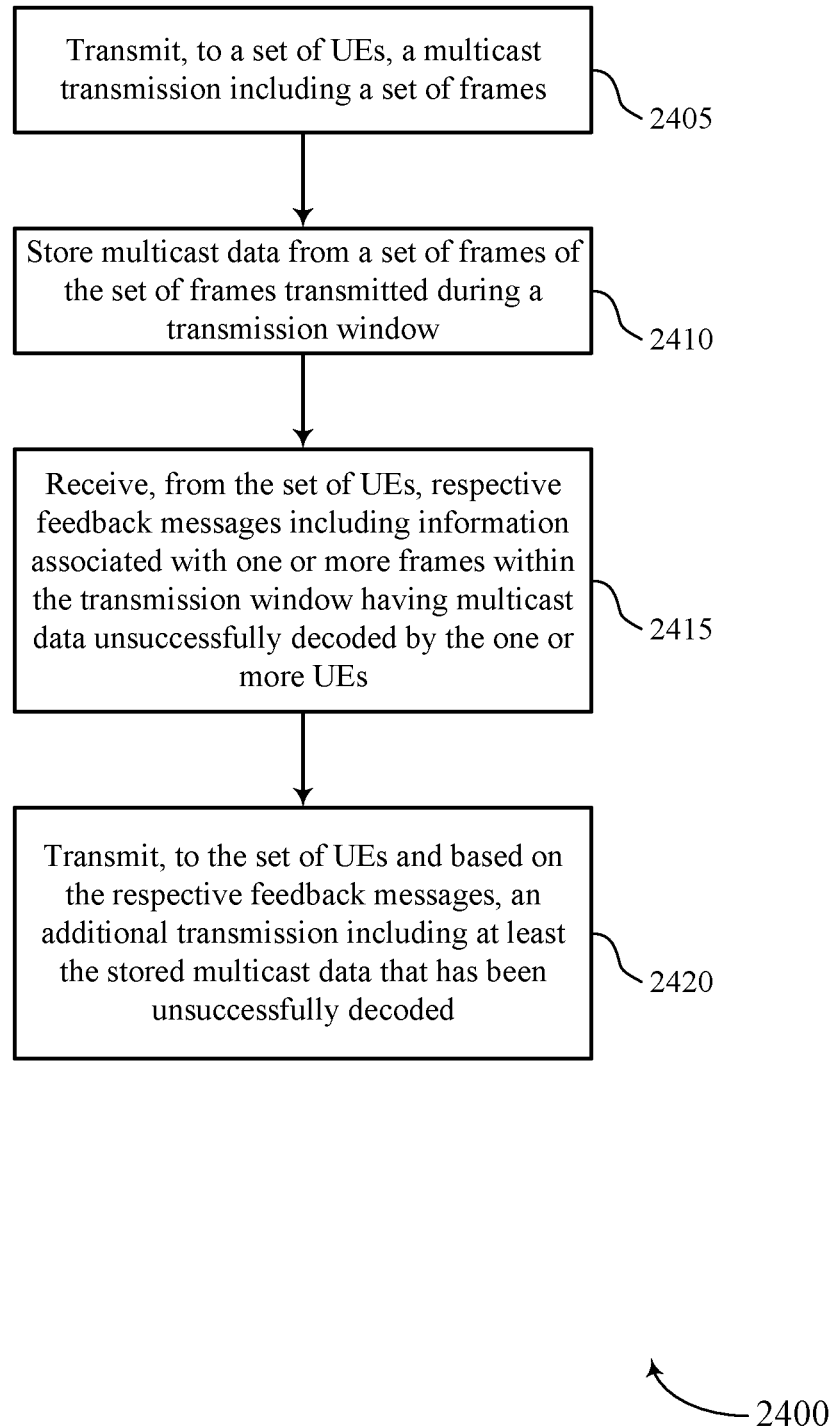

FIG. 24 shows a flowchart illustrating a method 2400 in accordance with aspects of the present disclosure. The operations of method 2400 may be implemented by a base station 105 or its components as described herein. For example, the operations of method 2400 may be performed by a base station communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2405, the base station may transmit, to a set of UEs 115, a multicast transmission including a set of frames. The operations of 2405 may be performed according to the methods described herein. In some examples, aspects of the operations of 2405 may be performed by a multicast transmitter as described with reference to FIGS. 13 through 16.

At 2410, the base station may store multicast data from a set of frames of the set of frames transmitted during a transmission window. The operations of 2410 may be performed according to the methods described herein. In some examples, aspects of the operations of 2410 may be performed by a multicast storage manager as described with reference to FIGS. 13 through 16.

At 2415, the base station may receive, from the set of UEs 115, respective feedback messages including information associated with one or more frames within the transmission window having multicast data unsuccessfully decoded by the one or more UEs 115. The operations of 2415 may be performed according to the methods described herein. In some examples, aspects of the operations of 2415 may be performed by a feedback receiver as described with reference to FIGS. 13 through 16.

At 2420, the base station may transmit, to the set of UEs 115 and based on the respective feedback messages, an additional transmission including at least the stored multicast data that has been unsuccessfully decoded. The operations of 2420 may be performed according to the methods described herein. In some examples, aspects of the operations of 2420 may be performed by a multicast transmitter as described with reference to FIGS. 13 through 16.

Figure 25:
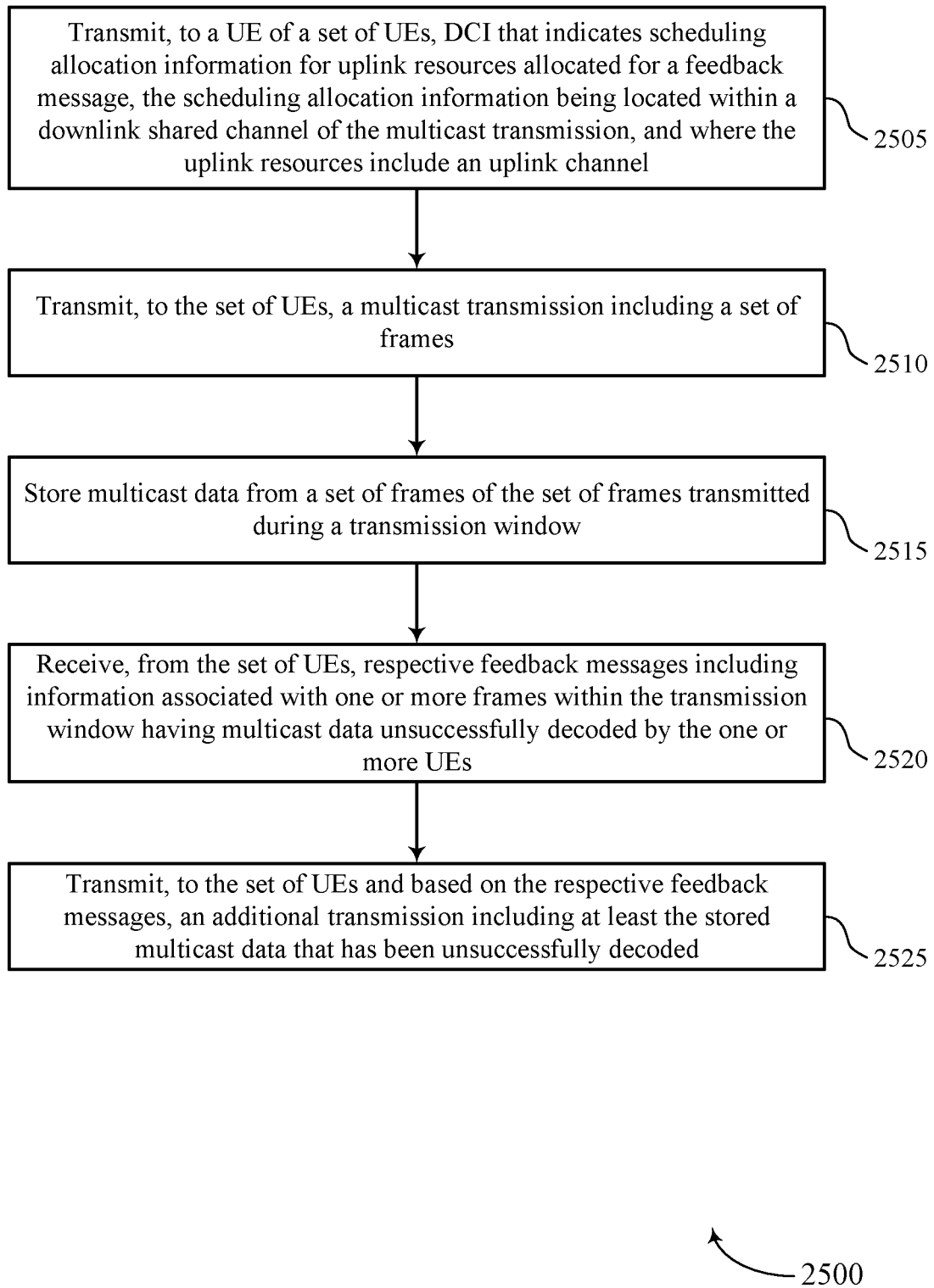

FIG. 25 shows a flowchart illustrating a method 2500 in accordance with aspects of the present disclosure. The operations of method 2500 may be implemented by a base station 105 or its components as described herein. For example, the operations of method 2500 may be performed by a base station communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2505, the base station may transmit, to a UE of the set of UEs 115, DCI that indicates scheduling allocation information for uplink resources allocated for a feedback message, the scheduling allocation information being located within a downlink shared channel of the multicast transmission, and where the uplink resources include an uplink channel (e.g., an UL-SCH, dedicated uplink channel resources). The operations of 2505 may be performed according to the methods described herein. In some examples, aspects of the operations of 2505 may be performed by a feedback allocation transmitter as described with reference to FIGS. 13 through 16.

At 2510, the base station may transmit, to a set of UEs 115, a multicast transmission including a set of frames. The operations of 2510 may be performed according to the methods described herein. In some examples, aspects of the operations of 2510 may be performed by a multicast transmitter as described with reference to FIGS. 13 through 16.

At 2515, the base station may store multicast data from a set of frames of the set of frames transmitted during a transmission window. The operations of 2515 may be performed according to the methods described herein. In some examples, aspects of the operations of 2515 may be performed by a multicast storage manager as described with reference to FIGS. 13 through 16.

At 2520, the base station may receive, from the set of UEs 115, respective feedback messages including information associated with one or more frames within the transmission window having multicast data unsuccessfully decoded by the one or more UEs 115. The operations of 2520 may be performed according to the methods described herein. In some examples, aspects of the operations of 2520 may be performed by a feedback receiver as described with reference to FIGS. 13 through 16.

At 2525, the base station may transmit, to the set of UEs 115 and based on the respective feedback messages, an additional transmission including at least the stored multicast data that has been unsuccessfully decoded. The operations of 2525 may be performed according to the methods described herein. In some examples, aspects of the operations of 2525 may be performed by a multicast transmitter as described with reference to FIGS. 13 through 16.

Figure 26:
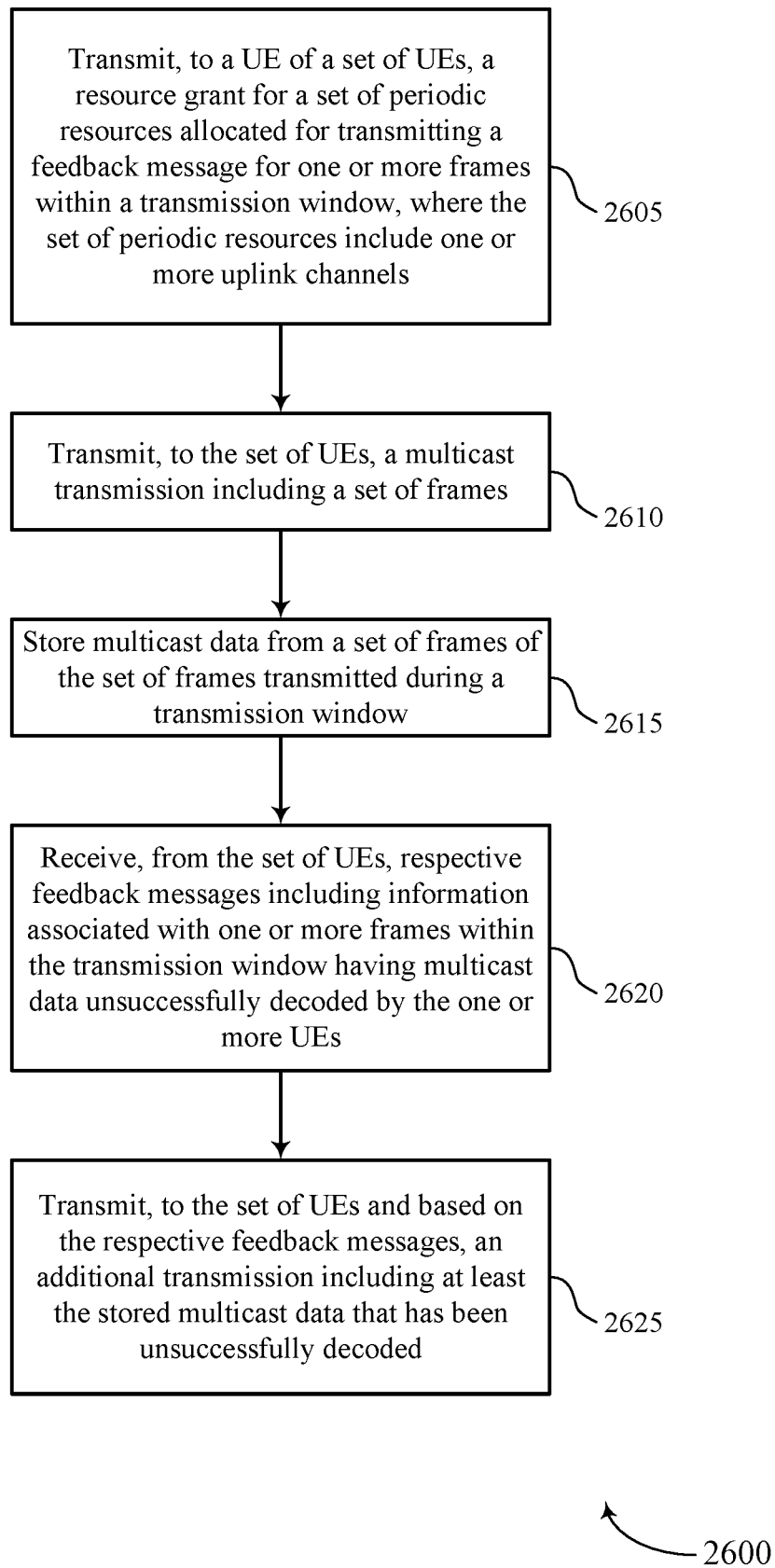

FIG. 26 shows a flowchart illustrating a method 2600 in accordance with aspects of the present disclosure. The operations of method 2600 may be implemented by a base station 105 or its components as described herein. For example, the operations of method 2600 may be performed by a base station communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2605, the base station may transmit, to a UE of the set of UEs 115, a resource grant for a set of periodic resources allocated for transmitting a feedback message for one or more frames within the transmission window, where the set of periodic resources include one or more uplink channels (e.g., UL-SCHs). The operations of 2605 may be performed according to the methods described herein. In some examples, aspects of the operations of 2605 may be performed by a feedback allocation transmitter as described with reference to FIGS. 13 through 16.

At 2610, the base station may transmit, to a set of UEs 115, a multicast transmission including a set of frames. The operations of 2610 may be performed according to the methods described herein. In some examples, aspects of the operations of 2610 may be performed by a multicast transmitter as described with reference to FIGS. 13 through 16.

At 2615, the base station may store multicast data from a set of frames of the set of frames transmitted during a transmission window. The operations of 2615 may be performed according to the methods described herein. In some examples, aspects of the operations of 2615 may be performed by a multicast storage manager as described with reference to FIGS. 13 through 16.

At 2620, the base station may receive, from the set of UEs 115, respective feedback messages including information associated with one or more frames within the transmission window having multicast data unsuccessfully decoded by the one or more UEs 115. The operations of 2620 may be performed according to the methods described herein. In some examples, aspects of the operations of 2620 may be performed by a feedback receiver as described with reference to FIGS. 13 through 16.

At 2625, the base station may transmit, to the set of UEs 115 and based on the respective feedback messages, an additional transmission including at least the stored multicast data that has been unsuccessfully decoded. The operations of 2625 may be performed according to the methods described herein. In some examples, aspects of the operations of 2625 may be performed by a multicast transmitter as described with reference to FIGS. 13 through 16.

Figure 27:
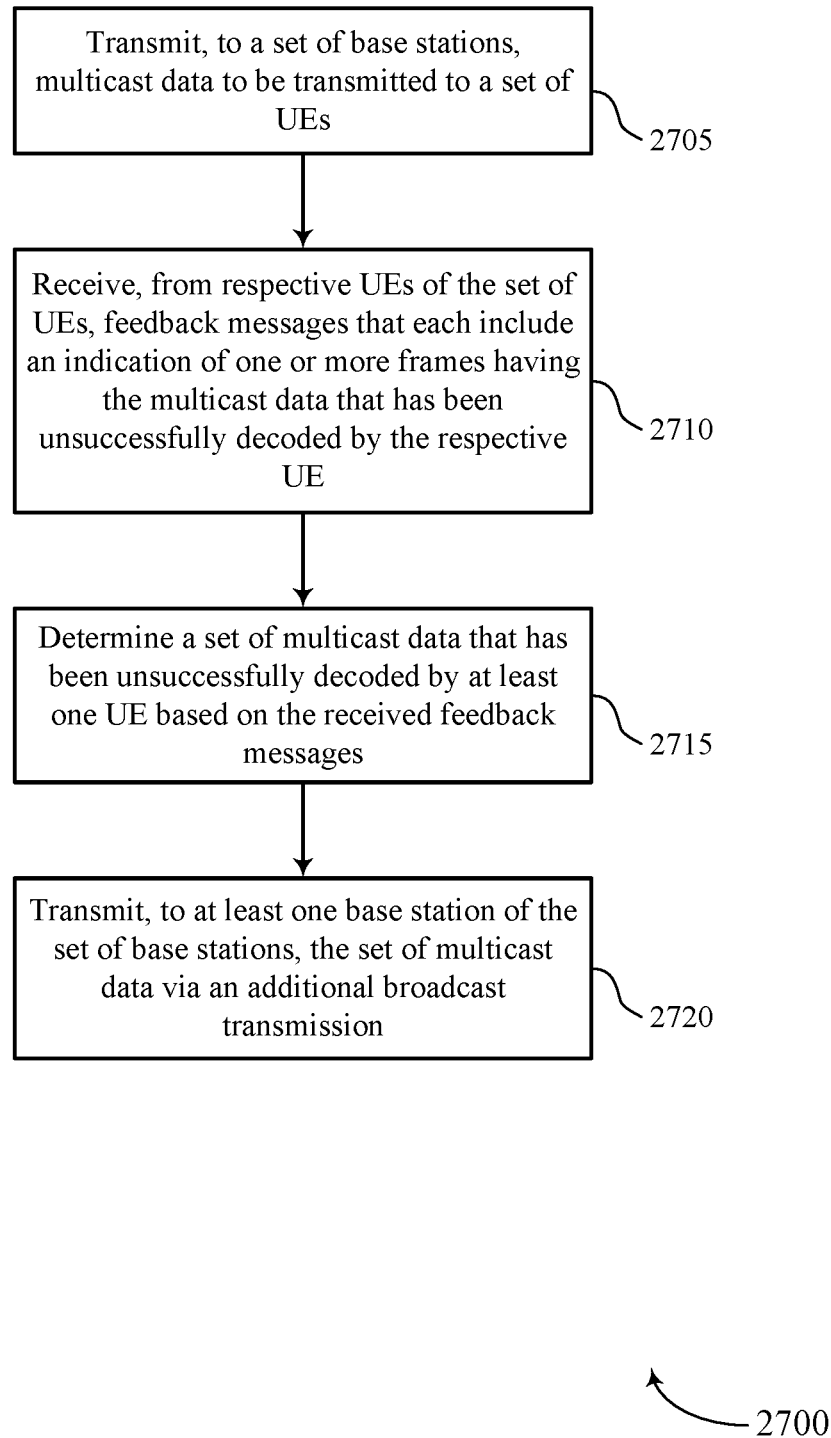

FIG. 27 shows a flowchart illustrating a method 2700 in accordance with aspects of the present disclosure. The operations of method 2700 may be implemented by a default or its components as described herein. For example, the operations of method 2700 may be performed by a default as described with reference to FIGS. 17 through 20. In some examples, a default may execute a set of instructions to control the functional elements of the default to perform the functions described herein. Additionally or alternatively, a default may perform aspects of the functions described herein using special-purpose hardware.

At 2705, the default may transmit, to a set of base stations 105, multicast data to be transmitted to a set of UEs 115. The operations of 2705 may be performed according to the methods described herein. In some examples, aspects of the operations of 2705 may be performed by a network multicast transmitter as described with reference to FIGS. 17 through 20.

At 2710, the default may receive, from respective UEs 115 of the set of UEs 115, feedback messages that each include an indication of one or more frames having the multicast data that has been unsuccessfully decoded by the respective UE. The operations of 2710 may be performed according to the methods described herein. In some examples, aspects of the operations of 2710 may be performed by a network feedback receiver as described with reference to FIGS. 17 through 20.

At 2715, the default may determine a set of multicast data that has been unsuccessfully decoded by at least one UE based on the received feedback messages. The operations of 2715 may be performed according to the methods described herein. In some examples, aspects of the operations of 2715 may be performed by a network unsuccessful decode manager as described with reference to FIGS. 17 through 20.

At 2720, the default may transmit, to at least one base station of the set of base stations 105, the set of multicast data via an additional broadcast transmission. The operations of 2720 may be performed according to the methods described herein. In some examples, aspects of the operations of 2720 may be performed by a network multicast transmitter as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a multicast transmission comprising a plurality of frames;
   attempting to decode multicast data within each frame of the plurality of frames;
   determining that multicast data within one or more respective frames from the plurality of frames has been unsuccessfully decoded;
   receiving scheduling allocation information for a feedback message indicating the one or more respective frames having the unsuccessfully decoded multicast data; and
   transmitting the feedback message based at least in part on the determination and receiving the scheduling allocation information.

2. The method of claim 1, further comprising:
   receiving downlink control information (DCI) that indicates the scheduling allocation information for the feedback message, wherein the scheduling allocation information is located within a downlink shared channel of the multicast transmission; and
   transmitting the feedback message via an uplink channel in accordance with the scheduling allocation information.

3. The method of claim 2, wherein the scheduling allocation information is encoded using a first coding scheme that is different from a second coding scheme used for encoding a set of data on the downlink shared channel.

4. The method of claim 1, wherein the feedback message indicates an index of the respective one or more respective frames having the unsuccessfully decoded multicast data.

5. The method of claim 1, further comprising:
   receiving a resource grant for a set of periodic resources used for transmitting the feedback message for a frame of the plurality of frames within a transmission time interval (TTI); and
   transmitting the feedback message via an uplink channel on at least one periodic resource of the set of periodic resources.

6. The method of claim 1, further comprising:
   receiving an indication of a UE group that the UE is assigned to;
   identifying uplink resources for transmitting the feedback message based at least in part on the UE group; and
   transmitting the feedback message via an uplink control channel on the identified uplink resources.

7. The method of claim 1, further comprising:
   receiving an additional transmission comprising at least the unsuccessfully decoded multicast data.

8. The method of claim 1, further comprising:
   transmitting the feedback message to a network node based at least in part on the determination, wherein the feedback message is transmitted using a multicast automatic repeat request (ARQ) protocol layer; and
   receiving, from a base station associated with the network node, an additional transmission comprising at least the unsuccessfully decoded multicast data.

9. The method of claim 8, wherein the network node comprises a user plane function.

10. The method of claim 1, further comprising:
    receiving the multicast transmission from a first base station;
    performing a handover to a second base station, wherein the feedback message is transmitted to the second base station based at least in part on the handover; and
    receiving, from the second base station, at least the unsuccessfully decoded multicast data.

11. The method of claim 1, further comprising:
    receiving the multicast transmission from a first base station;
    performing a handover to a second base station, wherein the feedback message is transmitted to a network node based at least in part on the handover; and
    receiving, from the second base station, at least the unsuccessfully decoded multicast data.

12. The method of claim 1, further comprising:
transmitting, to a base station, a request for uplink resources for transmitting the feedback message, wherein the request is based at least in part on receiving the multicast transmission.

13. The method of claim 1, further comprising:
receiving an indication of a set of parameters comprising a latency requirement, an automatic repeat request (ARQ) window length, a number of frames during which the feedback message is to be transmitted, a length of each frame of the plurality of frames, or a combination thereof.

14. The method of claim 1, wherein the feedback message comprises a negative acknowledgment (NACK).

15. A method for wireless communication at a base station, comprising:
transmitting, to a plurality of UEs, a multicast transmission comprising a plurality of frames;
storing multicast data from a set of frames of the plurality of frames transmitted during a transmission window;
transmitting, to the plurality of UEs, scheduling allocation information for one or more feedback messages indicating one or more frames within the transmission window having multicast data unsuccessfully decoded by one or more UEs;
receiving, from the plurality of UEs, respective feedback messages indicating one or more frames within the transmission window having multicast data unsuccessfully decoded by one or more UEs; and
transmitting, to the plurality of UEs and based at least in part on the respective feedback messages, an additional transmission comprising at least the stored multicast data that has been unsuccessfully decoded.

16. The method of claim 15, further comprising:
transmitting, to a UE of the plurality of UEs, a resource grant for a set of periodic resources allocated for transmitting a feedback message for one or more frames within the transmission window, wherein the set of periodic resources comprise one or more uplink channels.

17. The method of claim 15, further comprising:
determining that the respective feedback messages from the one or more UEs are to be received during two or more frames;
grouping the plurality of UEs into a set of UE groups based at least in part on the determination;
configuring time offset values associated with each UE group of the set of UE groups, wherein time offset values are indicative of different uplink resources allocated for receiving the respective feedback messages; and
transmitting, to the plurality of UEs, an indication of the set of UE groups and the time offset values associated with each UE group.

18. The method of claim 15, wherein receiving the respective feedback messages from the one or more UEs comprises:
receiving a first feedback message from a first UE indicating a first frame having multicast data that has been unsuccessfully decoded;
receiving a second feedback message from a second UE indicating a second frame having multicast data that has been unsuccessfully decoded; and
transmitting, within the additional transmission, the multicast data of the first frame and the second frame.

19. The method of claim 15, further comprising:
determining a feedback period for receiving feedback from the plurality of UEs; and
transmitting the additional transmission subsequent to the feedback period.

20. The method of claim 15, further comprising:
performing a handover of a first UE from the plurality of UEs to a second base station; and
transmitting, to the second base station, the stored multicast data from the transmission window based at least in part on the handover.

21. The method of claim 15, further comprising:
receiving, from a network node, an indication of a mapping of sequence numbers to frames; and
assigning a respective sequence number to each of the one or more frames based at least in part on the mapping.

22. A method for wireless communication at a network node, comprising:
transmitting, to a plurality of base stations, multicast data to be transmitted to a plurality of UEs;
transmitting an indication of a mapping of sequence numbers to frames having at least a portion of the multicast data to be transmitted to the plurality of UEs;
receiving, from respective UEs of the plurality of UEs based at least in part on transmitting the indication of the mapping, feedback messages indicating one or more frames having the multicast data that has been unsuccessfully decoded by the respective UE;
determining a set of multicast data that has been unsuccessfully decoded by at least one UE based at least in part on the received feedback messages; and
transmitting, to at least one base station of the plurality of base stations, the set of multicast data via an additional broadcast transmission.

23. The method of claim 22, further comprising:
identifying a first base station from the plurality of base stations that is serving at least one of the respective UEs, wherein the set of multicast data is transmitted to the identified first base station based at least in part on receiving the feedback messages.

24. The method of claim 22, wherein the set of multicast data is transmitted to each of the plurality of base stations.

25. The method of claim 22, further comprising:
identifying respective feedback messages associated with multicast data transmitted by each base station of the plurality of base stations.

26. The method of claim 22, further comprising:
determining that a first UE from the plurality of UEs has been handed over from a first base station to a second base station;
receiving a feedback message from the first UE indicating that one or more frames having the multicast data has been unsuccessfully decoded by the first UE; and
transmitting the multicast data to the second base station based at least in part on the determination that the first UE has been handed over.

27. The method of claim 22, wherein the feedback messages are received using a multicast automatic repeat request (ARQ) protocol layer.

28. The method of claim 22, wherein the network node comprises a user plane function (UPF).

29. An apparatus for wireless communication at a user equipment (UE), comprising:
a processor, memory in electronic communication with the processor;

and instructions stored in the memory and executable by the processor to cause the apparatus to:

receive a multicast transmission comprising a plurality of frames;

attempt to decode multicast data within each frame of the plurality of frames;

determine that multicast data within one or more respective frames from the plurality of frames has been unsuccessfully decoded;

receive scheduling allocation information for a feedback message indicating the one or more respective frames having the unsuccessfully decoded multicast data; and transmit the feedback message based at least in part on the determination and receiving the scheduling allocation information.

* * * * *